US007888616B2

(12) United States Patent
Berdelle-Hilge

(10) Patent No.: US 7,888,616 B2
(45) Date of Patent: Feb. 15, 2011

(54) POST PROCESSING SYSTEM AND METHOD

(75) Inventor: Peter Berdelle-Hilge, Constance (DE)

(73) Assignee: Siemens Aktiengesellschaft, Munich (DE)

( * ) Notice: Subject to any disclaimer, the term of this patent is extended or adjusted under 35 U.S.C. 154(b) by 600 days.

(21) Appl. No.: 11/886,615

(22) PCT Filed: Mar. 21, 2006

(86) PCT No.: PCT/IB2006/000703

§ 371 (c)(1), (2), (4) Date: Sep. 18, 2007

(87) PCT Pub. No.: WO2006/100594

PCT Pub. Date: Sep. 28, 2006

(65) Prior Publication Data

US 2009/0050541 A1 Feb. 26, 2009

Related U.S. Application Data

(60) Provisional application No. 60/663,247, filed on Mar. 21, 2005.

(51) Int. Cl.
*G06K 9/00* (2006.01)

(52) U.S. Cl. ....................... 209/584; 209/509; 209/552; 209/900

(58) Field of Classification Search ................. 209/509, 209/552, 584, 621, 630; 700/214, 223, 224; 198/348, 370.05
See application file for complete search history.

(56) References Cited

U.S. PATENT DOCUMENTS 3,573,748 A 4/1971 Holme
4,593,896 A 6/1986 Nakamura (Continued)

FOREIGN PATENT DOCUMENTS

DE 4000603 C2 4/1998

(Continued)

OTHER PUBLICATIONS

Derwent Abstract—DE 199 43 362 A1; Mar. 22, 2001; Siemens AG, D-80333 München, Germany.

*Primary Examiner*—Stefanos Karmis
*Assistant Examiner*—Terrell H Matthews
(74) *Attorney, Agent, or Firm*—Laurence A. Greenberg; Werner H. Stemer; Ralph E. Locher

(57) ABSTRACT

An apparatus for arranging flat mail items into a sequence of delivery points has a singling device having a device for determining address information located on the mail items. A temporary storage device has pouches that open downward and are connected to a circulating conveying device. The mail items are transportable from a read device to one pouch-loading station. Output conveyors accept the mail items from the pouches and transport the mail items to a stacking device. Each output conveyor has segments and moves relative to the temporary storage device. A part of an output conveyor is arranged beneath an overlapping area. A transporting speed and direction of an output conveyor are matched to a transporting speed and direction of the temporary storage device such that each segment of the output conveyor passes by each pouch of the temporary storage device at least once while moving along the overlapping area.

13 Claims, 30 Drawing Sheets

U.S. PATENT DOCUMENTS

| | | | | |
|---|---|---|---|---|
| 4,736,936 | A | 4/1988 | Hertel et al. | |
| 5,358,229 | A | 10/1994 | Groel et al. | |
| 5,433,325 | A * | 7/1995 | Levaro et al. | 209/584 |
| 5,462,268 | A | 10/1995 | Remy et al. | |
| 5,931,634 | A | 8/1999 | Neri | |
| 5,994,657 | A * | 11/1999 | Maier et al. | 209/584 |
| 7,029,225 | B2 * | 4/2006 | Zimmermann | 414/789.9 |
| 7,397,011 | B2 | 7/2008 | Berdelle-Hilge | |
| 7,464,822 | B2 * | 12/2008 | Coffelt et al. | 209/559 |
| 2003/0021668 | A1 | 1/2003 | Michler et al. | |
| 2004/0065595 | A1 * | 4/2004 | Hanson | 209/584 |
| 2004/0153208 | A1 * | 8/2004 | Wilke | 700/224 |
| 2005/0056572 | A1 * | 3/2005 | Wilke | 209/584 |
| 2006/0102529 | A1 | 5/2006 | Wilke | |
| 2006/0259185 | A1 | 11/2006 | Berdelle-Hilge | |
| 2007/0022719 | A1 | 2/2007 | Berdelle-Hilge | |
| 2007/0027574 | A1 | 2/2007 | Berdelle-Hilge et al. | |

FOREIGN PATENT DOCUMENTS

| | | | |
|---|---|---|---|
| DE | 199 43 362 | A1 | 3/2001 |
| EP | 1220721 | B1 | 12/2004 |
| WO | 0119537 | A1 | 3/2001 |
| WO | 2004067193 | A1 | 8/2004 |
| WO | 2004071680 | A1 | 8/2004 |
| WO | 2005025764 | A1 | 3/2005 |
| WO | 2005025765 | A1 | 3/2005 |

* cited by examiner

POST PROCESSING SYSTEM AND METHOD

CROSS-REFERENCE TO RELATED APPLICATIONS

The present application is a national phase application of international application no. PCT/IB2006/000703, filed on Mar. 21, 2006, which claims priority to U.S. provisional application No. 60/663,247, filed on Mar. 21, 2005, both of which are hereby incorporated by reference.

BACKGROUND OF THE INVENTION

The invention relates generally to a system for processing mail items, in particular to an apparatus for arranging flat such items into a specifiable sequence of delivery points assigned to recipient addresses.

Mail sorting offices process millions of mail items a day in preparation for their delivery to individual recipient addresses. The term "mail item" encompasses letters, magazines, and periodicals, as well as mailed books and other flat such items. Before, for example, a mail-delivery operative starts making deliveries, a mail-processing system sorts the mail items in a mail sorting office. One of said operative's tasks is to arrange the mail items in the order in which they will be delivered so as to achieve efficient delivering.

A mail-processing system is highly automated in order to manage the number of items mailed daily. The mail-processing system can contain a system that processes the mail items, packages them according to delivery points, then arranges the resulting volumes into their delivery sequence (it is also called a DPP system, where DPP stands for Delivery Point Packaging). Alongside further functions, processing includes singling the mail items, reading their recipient addresses, grouping them, and carrier-sequencing them according to their recipient addresses. While generally expected to operate efficiently and reliably, mail-processing systems of said type should at the same time avoid subjecting the mail items to excessive handling so that said items will sustain no or only minor damage.

For arranging mail items into a specific sequence a solution was known (EP 820 81 8 A1) that employs a temporary storage device consisting of pouches or similar elements each able to accept one mail item and feed it out again into the actual receptacle compartment in response to a control instruction. All mail items requiring to be thus arranged are therein first placed into the temporary storage device's pouches in any order. Said items are then removed from the temporary storage device's pouches and transferred to the receptacle compartments in such a way as to be located in the latter in the order requiring to be established. A separate receptacle compartment is provided for each mail item. Sorting takes place over two circulations of the temporary storage device's pouches: One circulation for filling and another for emptying the pouches.

That, however, requires a large number of receptacle compartments each having to be fitted with a control mechanism that initiates transfer of the mail item from the correct pouch of the temporary storage device.

Known also was a corresponding solution wherein in each case a plurality of mail items are stacked in ordered fashion into the receptacle compartments. The mail items are transferred from the containers to the receptacle compartments over a plurality of circulations, with the sequence of the mail items in each receptacle compartment corresponding to the sequence of the delivery points assigned to the addresses of the mail items located in the respective receptacle compartment (DE 199 43 362 A1).

Known from U.S. Pat. No. 3,573,748 is an apparatus wherein mail items are emptied from static pouches onto a segmented output conveyor, and known from U.S. Pat. No. 5,462,268 A is an apparatus wherein mail items are emptied into containers from circulating pouches and hence into sections of a conveyor.

Known from WO 2005/025763 A1 is a process description for carrier-sequencing by means of a sorting system having a temporary storage device. Mailing volumes that can be larger than the temporary storage device's storage capacity are therein processed efficiently.

SUMMARY OF THE INVENTION

The object of the invention is to provide an apparatus for sorting flat mail items according to a specifiable sequence of delivery points assigned to the recipient addresses wherein said items are processed efficiently and with an increased throughput rate. That is done inter alia by individually singling and reading the mail items once only and arranging them into the specified sequence by means of circulating temporary storage devices, with the effort required for removing the mail items being reduced and its being possible to additionally include other mail items or mail streams.

According to one exemplary embodiment, located beneath a continuous part, referred to as an overlapping area, of the temporary storage device is an output conveyor moving at a speed relative thereto for accepting the mail items from the temporary storage device for further transporting said items to a stacking device. The output conveyor's transporting speed is matched to that of the temporary storage device such that each of the output conveyor's segments will pass by each of the temporary storage device's storage points at least once while moving along the overlapping area, and with the mail items being emptied onto the output conveyor from the temporary storage device's storage points in keeping with the read recipient addresses in such a way as to exit the output conveyor in the stacking device in the specified sequence of the recipient addresses. The apparatus has for that purpose at least one output.

So that the mail items will lie reliably next to or on top of each other it is advantageous to divide the output conveyor for example into segments having barriers, employing therefor a sectional conveyor or individual carrying means (trays, shells).

To be able to process non-constant streams of incoming mail items without loss of sorting performance and to process streams of singled mail items between which there is a constant gap, a buffering device for accepting the read mail items is advantageously located between the read device(s) and temporary storage device. The read mail items can in the loading station for the buffer each be loaded into the buffer pouches that feed out the mail items in a controlled manner in at least one output to empty storage points of the sorting temporary storage device and which can in a further advantageous embodiment be coupled to a circulating, endless conveyor means and decoupled therefrom. The buffering device's buffer pouches are coupled to the conveyor means during transfer and the transferring buffer moves, positioned with respect to the storage point being loaded, in the same direction and at the same speed.

It is also advantageous for the temporary storage device and output conveyor to circulate counter to each other so that the output conveyor's speed can be kept relatively low.

For combining the mail items from the temporary storage device with further mail items/mailing streams, apparatuses for loading further mail items requiring to be distributed among the respective recipient addresses onto the segments assigned to the recipient addresses are advantageously located above the parts of the output conveyor that lie outside the overlapping area.

Sensors for measuring the thicknesses of the mail items are provided to insure that said items will be guided to the output section only up to the maximum height provided. If the overall height of the mail items assigned to a delivery point exceeds a limiting value, then the bordering areas can, if required, also be loaded with mail items belonging to the same delivery point.

A plurality of mail items having different but neighboring delivery points can also be loaded in a segment of the output conveyor to insure its optimal use.

The volumes of mail items must therein lie in the output conveyor's segments one on top of the other in the specified sequence of the delivery points.

So that the overlapping area is as large as possible referred to the base area, it is advantageous to arrange the output conveyor beneath a part of the temporary storage device in a unshaped manner.

It is also advantageous for the temporary storage device and/or buffer to, outside the overlapping area, have at least one loading and unloading station for additionally feeding out mail items from the storage points according to specific sorting criteria. In addition to sorting, that will also enable mail items to be separated according to specific criteria.

To keep the base area of the apparatus as small as possible it is advantageous to duct the part of the temporary storage device projecting beyond the overlapping area and not located beneath the buffer's unloading stations into an additional plane located above the plane of the buffer or below the plane of the output conveyor, with the mail items being able to circulate in both planes in the same direction.

It is therein especially advantageous for deflecting of the temporary storage device in a height-surmounting manner to take place inside the buffer.

Provided in addition to a first apparatus for sorting is a second that is rotated relative to the first through 180° around the vertical axis and with which the part of the temporary storage device not located above the output conveyor is located in the other plane opposite the corresponding part of the first apparatus for sorting. The two apparatuses can thus be nested one within the other, as a result of which the required base area is almost halved as compared with a separate mounting.

To save the mail-delivery operative manual work it is advantageous to between the output conveyor and stacking device provide a device for positioning in which the mail items belonging together for in each case one delivery point are prior to stacking packed into bags or carriers or furnished with bandings or small marker tags.

BRIEF DESCRIPTION OF THE SEVERAL VIEWS OF THE DRAWINGS

The invention will next be explained in more detail in an exemplary embodiment with the aid of the drawing.

DETAILED DESCRIPTION OF THE INVENTION

Figure 1:
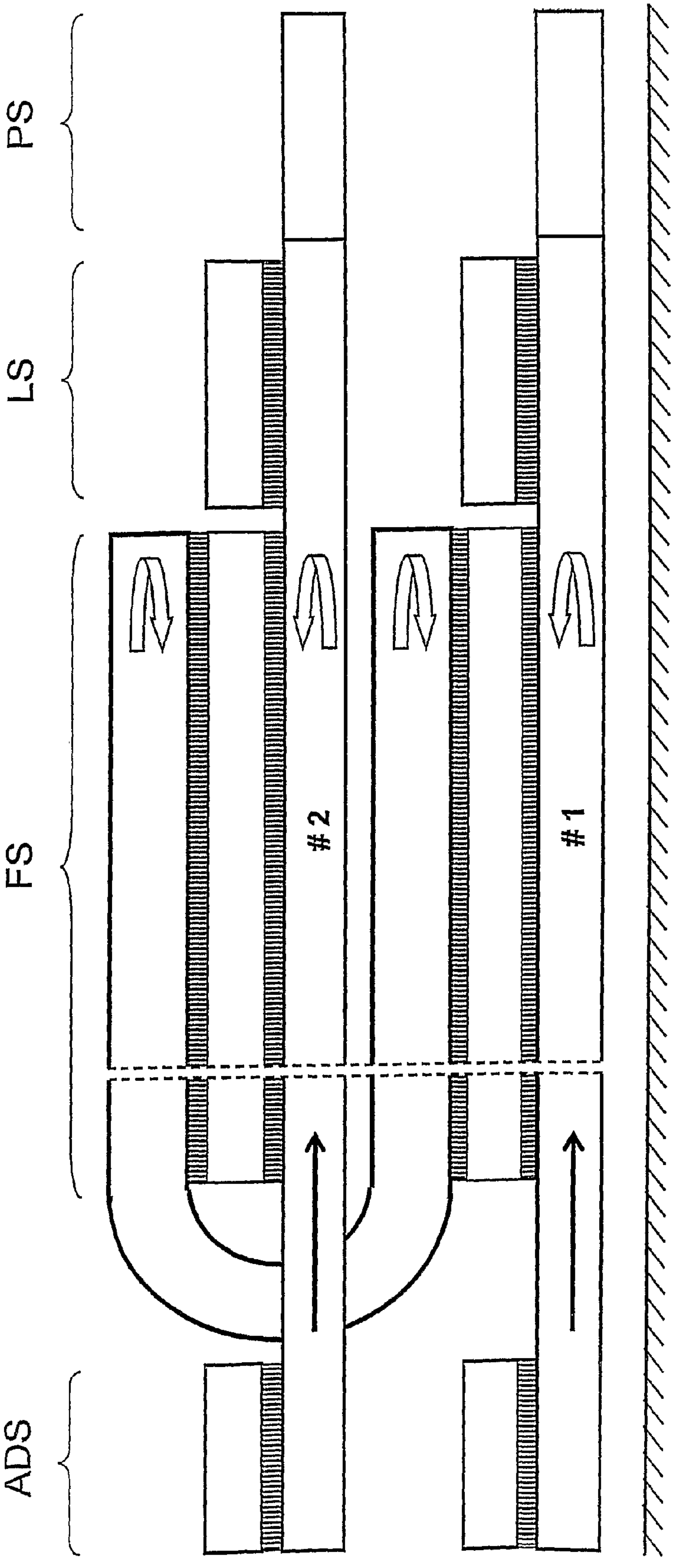
FIG. 1 is a schematic overview of a system for sorting mail items.
Figure 2:
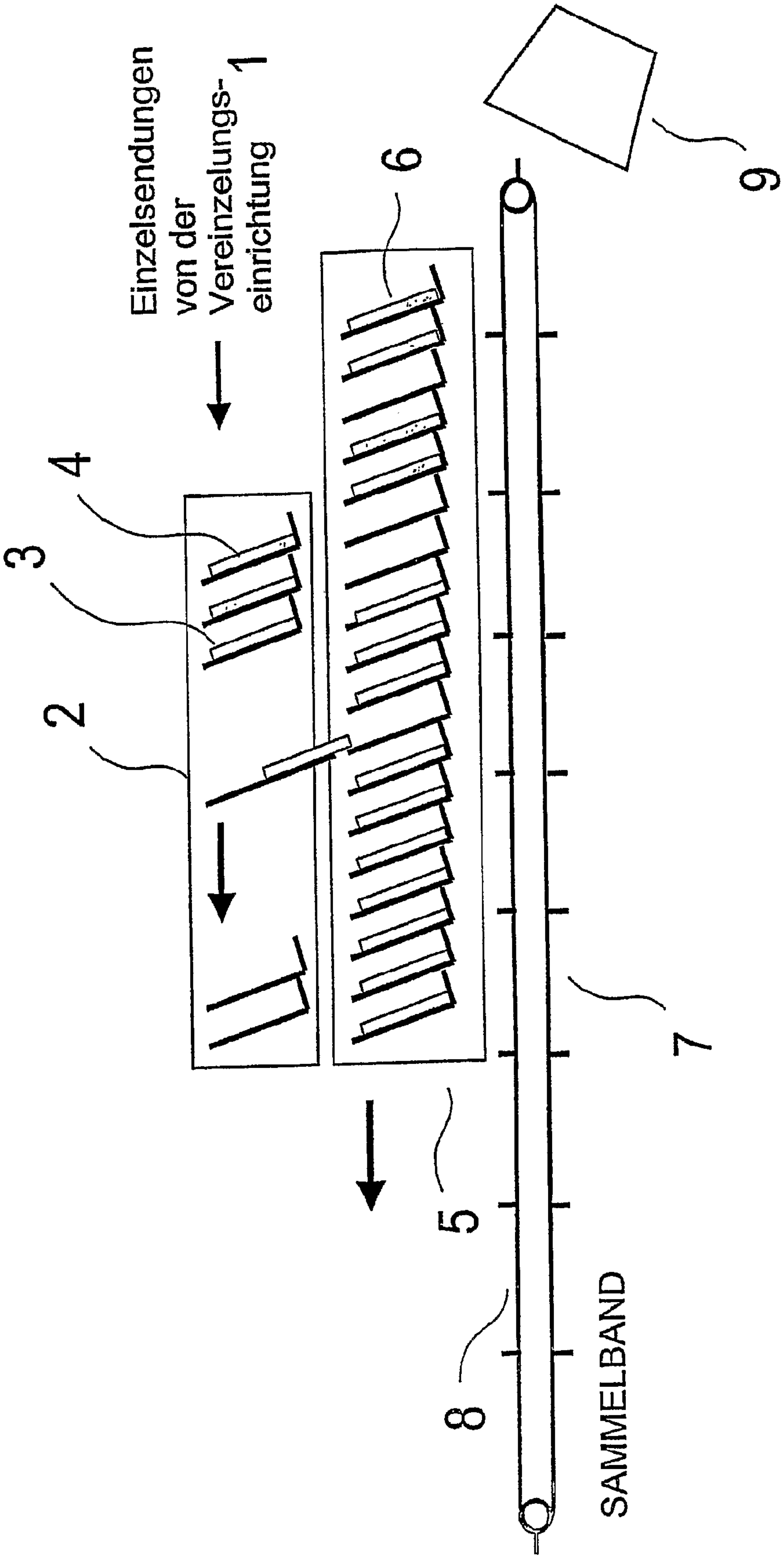
FIG. 2 is a schematic side view of an apparatus for sorting into the distribution sequence with loading of the temporary storage device.
Figure 3:
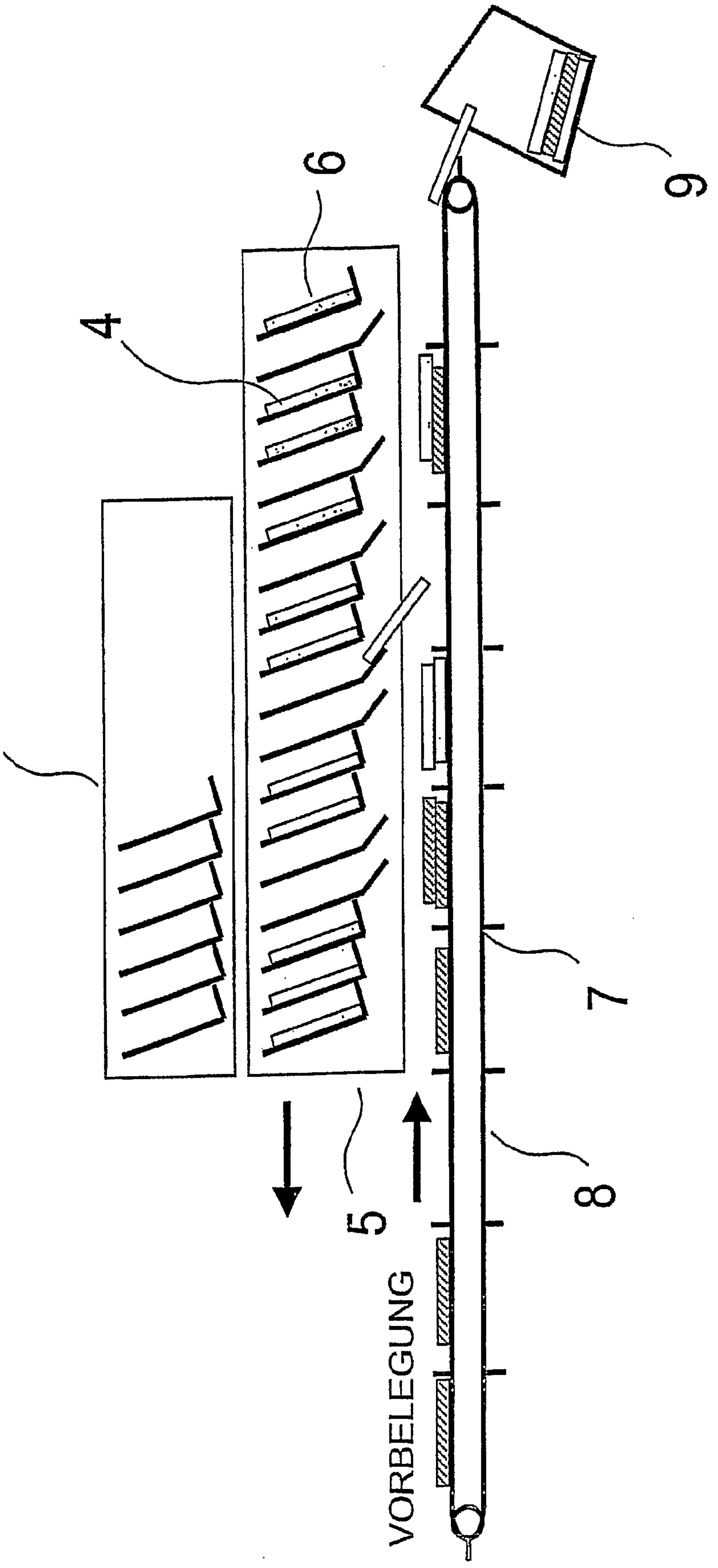
FIG. 3 is a schematic side view of an apparatus with loading of the segmented output conveyor.
Figure 4:
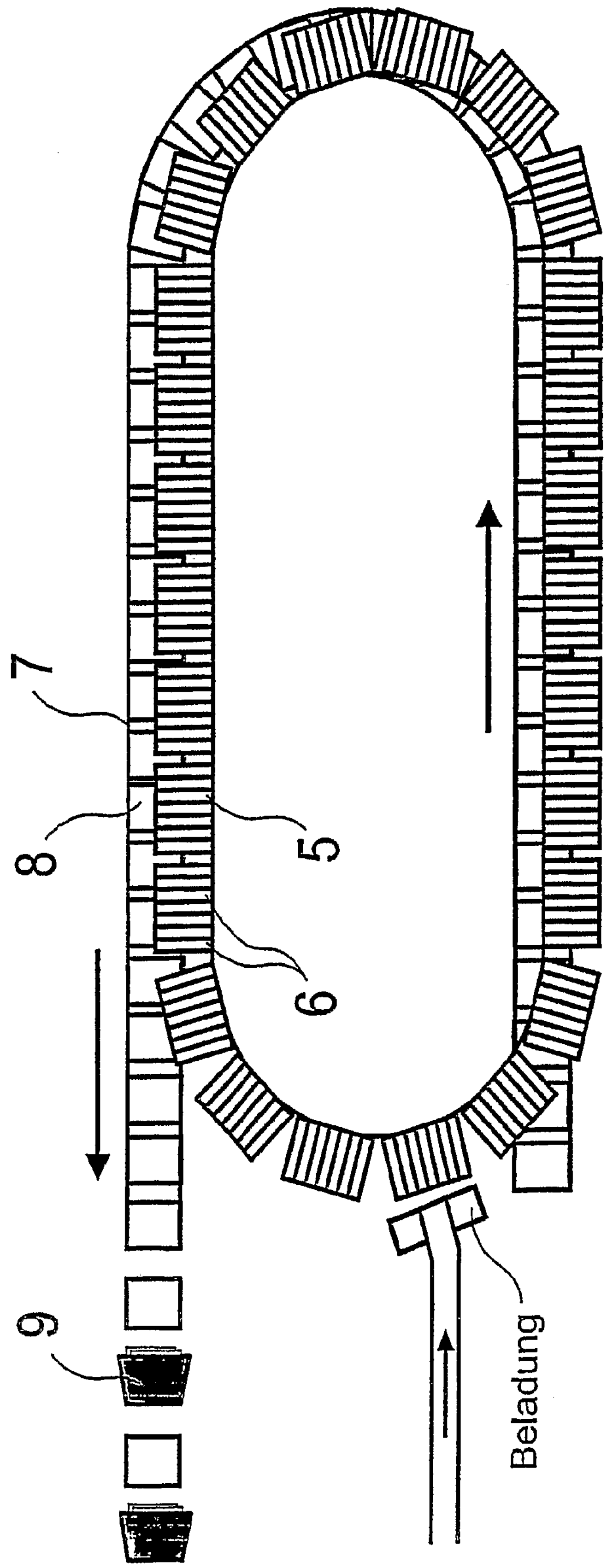
FIG. 4 is a schematic top view of an apparatus for sorting.

FIG. 1 is a schematic overview of an exemplary embodiment of a system for sorting mail items. The overview illustrates the basic flows and the functional correlations within the system. Said flows and correlations are illustrated in FIG. 1 by functional blocks for processing unaddressed mail items ADS, processing large letters (flats) FS, and letter processing LS, as well as a packaging function PS. Said functional blocks constitute some of the system's main functions. A person skilled in the area of mail-sorting systems will, though, appreciate that the system can contain further functional blocks, for example for reading and recognizing address fields. What furthermore applies is that the division into said functional blocks serves here to simplify the description and that in a specific implementation the functions can be divided differently or functions shared. There follows a more detailed description of some exemplary embodiments and their structural components.

The function block for processing unaddressed mail items ADS processes, for example, items of advertising mail delivered by various major customers directly to the mail distribution center. A major customer's items of advertising mail can be delivered there on pallets, for example. The function block ADS processes the items of advertising mail in batches, with each batch requiring to be processed containing different major customers' items of advertising mail. At the end of processing a multiplicity of items of advertising mail of the major customer A and a multiplicity of items of advertising mail of the major customer B, for example, will for each mail-delivery operative have been fed separately and according to the recipient addresses into further processing operations.

The function block for large-letter processing FS sorts large flat letters according to the sequence of their delivery. Included therein are, inter alia, reading the recipient addresses, loading the large letters onto an apparatus for sorting, and actual sorting. At the end of processing, the large letters will for each mail-delivery operative have been arranged into a delivery sequence according to their recipient addresses and combined with the unaddressed mail items for each delivery point.

The function block for letter processing LS sorts smaller letters likewise according to the sequence of their delivery. That processing, too, includes, inter alia, reading the recipient addresses or an identification code applied in preceding processing operations, loading onto an apparatus for sorting, and actual sorting. At the end of processing, the letters will for each mail-delivery operative have been arranged into a delivery sequence according to their recipient addresses and combined with the unaddressed mail items as well as with the large letters for each delivery point.

The function block for packaging PS packages the sorted mail items for each delivery point, for example using a plastic-foil wrapping. Each thus packaged volume of mail items for a delivery point is allocated in containers to the respective mail-delivery operative appropriately sequenced in keeping with said operative's delivery route.

The sorting of each type of mail item imposes different requirements on the system, for example in terms of throughput rate. It is characteristic of the system illustrated in FIG. 1 that it can be used for sorting different types of mail items. Depending on its specific implementation, the system therein allows said mail items to be sorted separately then combined for each delivery point and packaged.

The function block for processing large mail items FS is described in more detail in FIGS. 2-8. As shown in the exemplary embodiment in FIG. 2, the mail items 4 are the first to in a known manner be singled in a singling device 1 from a stack. The recipient addresses of the mail items 4 are then registered and determined in a read device (not shown). The read mail items 4 are then routed to a buffering device 2. Each mail item 4 is thence conveyed via a loading station into, for example, a circulating buffer pouch 3, with said buffer pouches 3 being, after being loaded, advantageously able to be recoupled in a controlled manner to a circulating conveyor means and decoupled therefrom in a controlled manner and with the transfer to the temporary storage device being able to take place in the coupled state.

If a plurality of singling devices 1 are provided for reasons relating to throughput rate, then the mail items 4 will be transported from each singling device 1 into the buffer pouches 3 via a separate loading station.

The buffering capability will make it possible to further process both a non-constant incoming stream arriving from the singling devices 1 and an outgoing steam that is not synchronous with the incoming stream and/or is not constant. It will furthermore be possible to process singling streams having a constant gap between the mail items. The buffer pouches 3 can in a controlled manner be opened downward to deliver the mail items 4 to empty storage points, for example pouches 6 of a further temporary storage device 5 circulating thereunder. The pouches 6 are therein permanently connected to the circulating conveying device.

The temporary storage device 5 has a multiplicity of storage points to which the mail items 4 can be transferred. The storage points can be embodied as pouches 6, sorting compartments, or other such carrying elements. The storage points will with no limitation on scope be referred to in the following as pouches 6. The storage points can be loaded and unloaded. The temporary storage device and the buffer pouches 3 circulate in the same direction.

The mail items 4 are arranged in the agreed sequence of delivery points by being dropped in a manner controlled by downward opening of the bases of the pouches 6 onto an output conveyor 7 that is divided into at least logical segments and is circulating counter to the temporary storage device 5 with its top tower.

The output conveyor 7 is therein arranged in a u-shaped manner in terms of its ground plan beneath the temporary storage device, which is to say the temporary storage device 5 is longer than the output conveyor 7.

The transporting speeds are mutually matched such that, while moving along the overlapping area having the temporary storage device 5 each segment 8 of the output conveyor 7 will pass by each pouch 6 of the temporary storage device 5 once. A plurality of mail items 4 can be loaded in a segment 8 up to a maximum overall height at which reliable transportation and reliable stacking characteristics (see further below) will be insured.

The output conveyor 7 can also have been pre-loaded with mail items by further sorting devices or input devices for all or special recipients.

At the end of the output conveyor 7 is a stacking device for accepting the stacked mail items 4 in the specified sequence into containers 9. A device for positioning in which the mail items of a delivery point that belong together are prior to stacking packed into bags and carriers or furnished with bandings or small marker tags can also be located between the output conveyor 7 and stacking device. In keeping with the position of the container 9 the mail items 4 can be stacked upright or lying flat in the container 9. The mail items 4 are loaded onto the output conveyor 7 in such a way as to exit it in the appropriate sequence. If mail items 4 having different but adjacent delivery points are loaded into a segment 8, then they must lie one above the other in the specified sequence of the delivery points but can then no longer be packaged for each delivery point.

Figure 5:
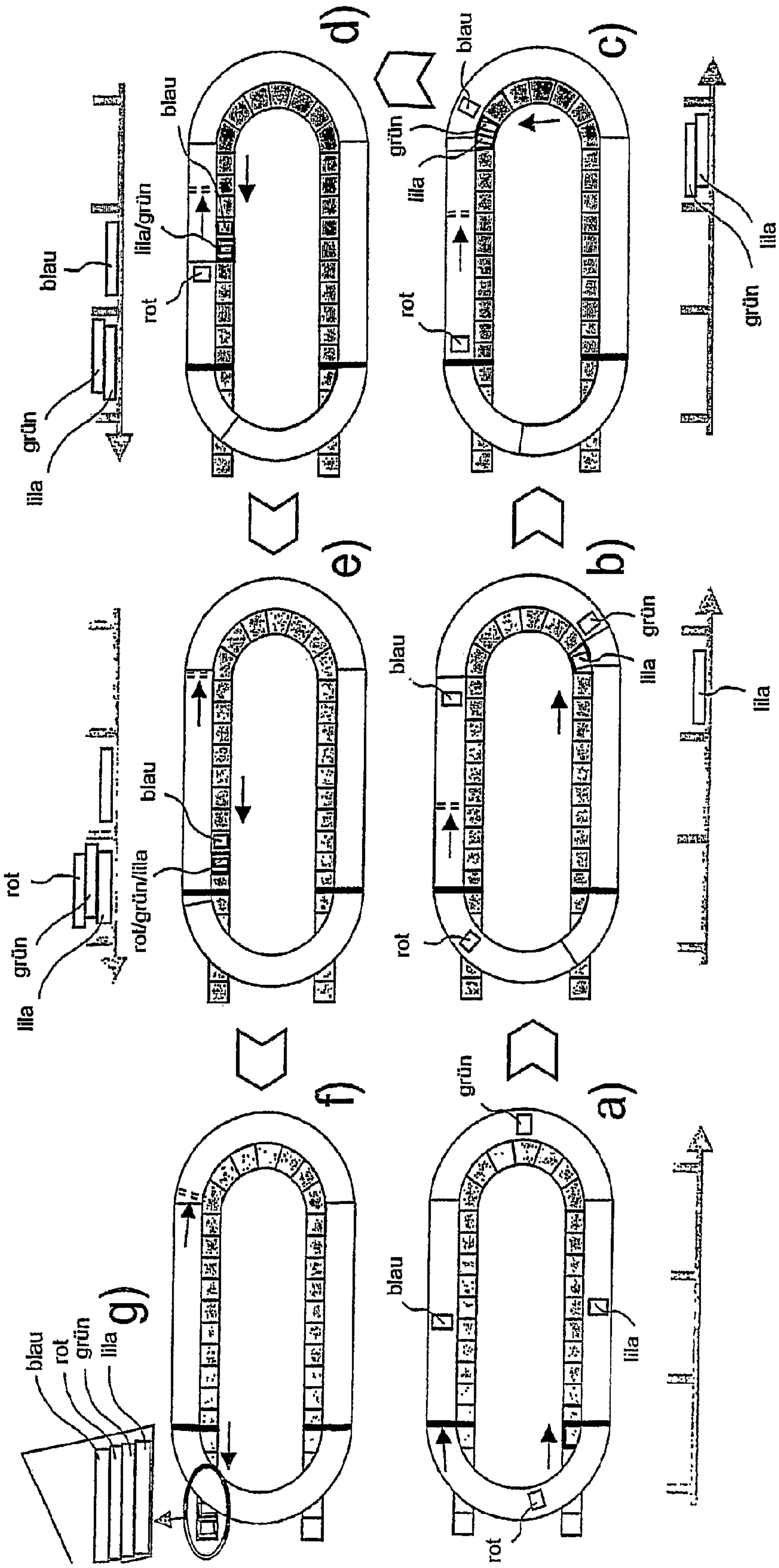
FIG. 5 is a schematic of the functioning principle using the schematic top view.

The sequence is for elucidation shown in FIG. 5 in a simple example.

The mail items 4 located in the temporary storage device 5 (FIG. 5*a*) are to be deposited into a container in the sequence, from top to bottom, blue, red, green, and lilac as shown in FIG. 5*g*. The temporary storage device 5 and the output conveyor 7 move counter to each other.

The mail item designated lilac is the first to be deposited into a segment of the output conveyor 7 (FIG. 5*b*). If the mail item 4 designated green is then located above said segment, it will be deposited on top of the mail item designated lilac (FIG. 5*c*) and the mail item 4 designated blue will, being the last mail item in sequence, pass by said segment and be unloaded into the next following segment (FIG. 5*d*).

In FIG. 5*e* the mail item designated red has reached the segment having the two mail items designated respectively lilac and green and is offloaded as the topmost mail item. That took place on the condition that the previously measured thicknesses of the mail items will allow the three mail items to be deposited into one segment. In the stacking device, the mail items 4 are then stacked into a container in the desired sequence (FIG. 5*f*).

The temporary storage device 5 can traverse two planes so that the apparatus for sorting can be accommodated on as small as possible a base area.

The part of the temporary storage device 5 not overlapping the output conveyor 7 can be folded around a horizontal axis above or below the overlapping part: The temporary storage device 5 will then basically be curved like a prone figure eight that has been folded at its node and is there encompassed by the buffering device 2. The actuators for opening the pouches 6 of the temporary storage device 5 can with constant synchronizing between the temporary storage device 5 and the output conveyor 7 be arranged in a stationary manner. Folding can also be horizontal in form.

Figure 6:
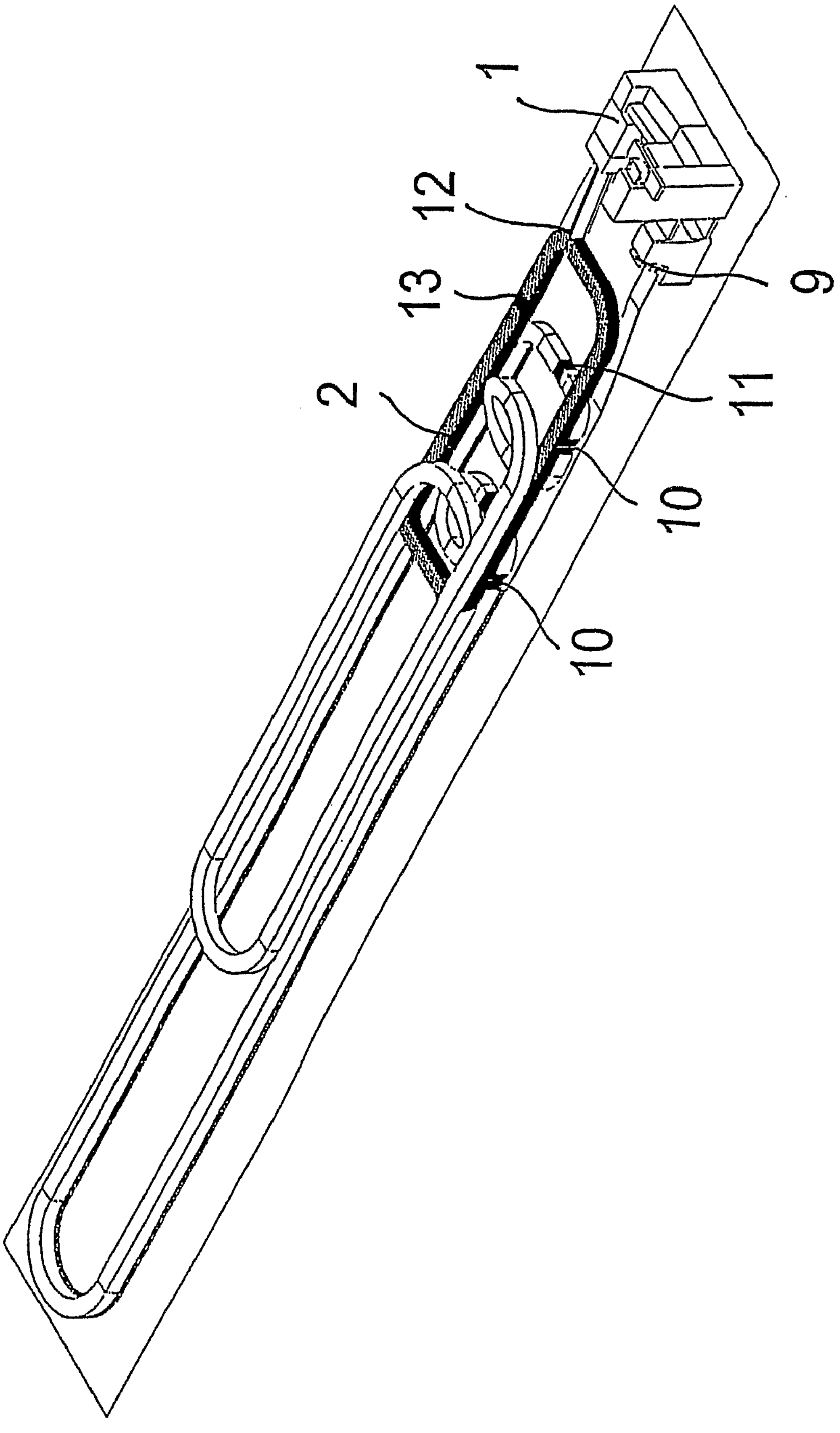
FIG. 6 is a perspective representation of an apparatus for sorting having a plurality of planes.

To keep the system as compact as possible, according to FIG. 6 there is at the plane crossover a 540° deflection across the system's interior. What can be seen outside the overlapping area are outputs 10 of the buffering device 2 for loading the pouches 6, unloading stations 11 for additionally feeding out mail items 4 from the pouches 6 according to specific sorting criteria, a loading station 12 for loading the buffer pouches with the mail items from the singling device 1, and an output 13 of the buffering device 2 for feeding out separated mail items.

Figure 7:
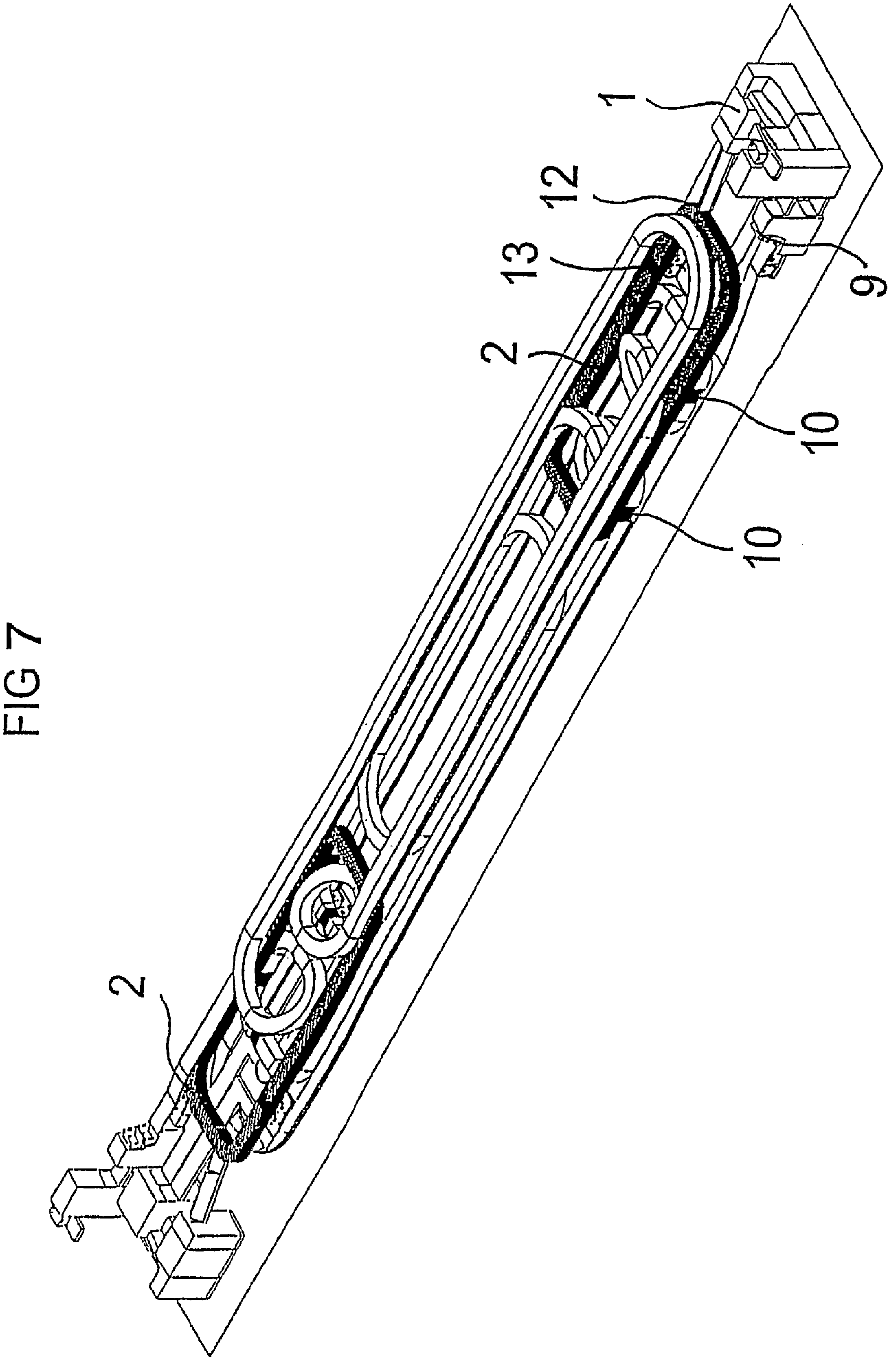
FIG. 7 is a perspective representation of two nested apparatuses for sorting.

If a second individual system B for sorting is turned through 180° around its vertical axis and the part of the temporary storage device 5 not overlapping the output conveyor 7 is folded in a manner counter to said system, then both systems A and B can, as shown in FIG. 7, be inserted one into the other, with the additional plane of the temporary storage device 5 then being in one system located above the plane of the buffering device 2 and in the other system below the plane of the buffering device 2. Only a small base area will consequently be required.

Figure 8:
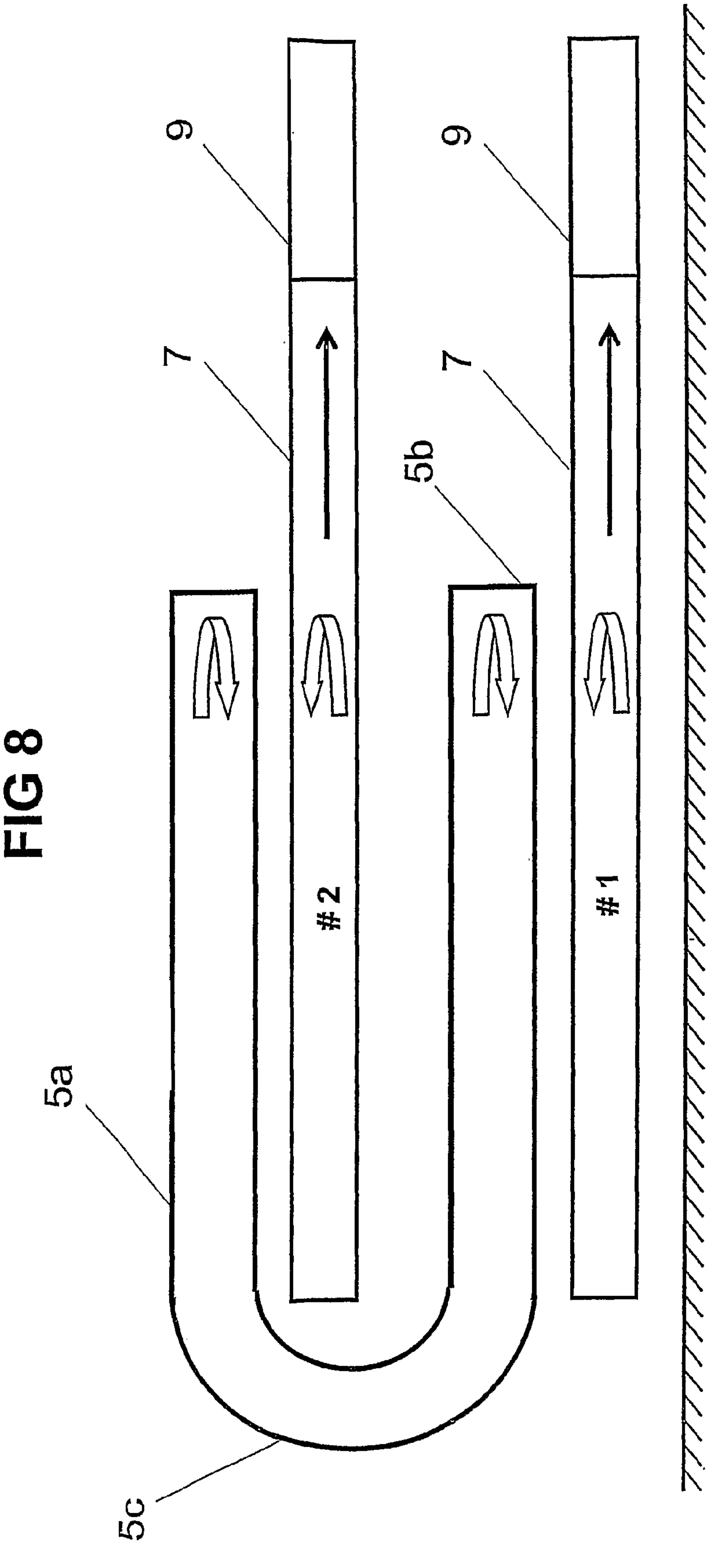
FIG. 8 is a schematic of an exemplary embodiment of an apparatus for sorting having two outputs.

FIG. 8 is a schematic of a further exemplary embodiment that offers an increased throughput rate but nonetheless requires a minimal base area. Said exemplary embodiment has more than one output conveyor 7 and hence more than one output. One output conveyor 7 can be embodied as a transportation link or a closed transportation loop having individual segments 8 (sectional conveyor) or a multiplicity of jointly transported carrying elements (trays, shells). Each output conveyor 7 is at its end (or, as the case may be, output) coupled to, for instance, a container 9. In that exemplary embodiment a device for positioning in which the mail items belonging together for one delivery point are prior to stacking packed into bags or carriers or furnished with bandings or small marker tags can also be located between the output conveyor 7 and the stacking device. The throughput rate is in the exemplary embodiment shown increased in proportion to the number of output conveyors 7, being for example doubled in the embodiment shown here.

In the exemplary embodiment of the apparatus shown in FIG. 8 the temporary storage device 5 serves two output conveyors 7. As can be seen from the side view shown, the output conveyors 7 are arranged one above the other on two planes, with the top plane being referenced #2 and the lower plane being referenced #1 in FIG. 8. The temporary storage device 5 has a top part 5*a* that extends across a part of the top output conveyor 7 and a lower part that extends across a part of the lower output conveyor 7. A connecting part 5*c* links the top and lower output conveyors 7. At the end of each output conveyor 7, meaning also of each plane, is a stacking device for accepting the mail items 4 in the specified sequence into containers 9, as already described above.

The connecting part 5*c* is in an exemplary embodiment embodied in the form of a vertical crossover. Said crossover can in an exemplary embodiment be a space curve along which the pouches 6 of the temporary storage device 5 move in order to move between the top part 5*a* and lower part 5*b*. An exemplary embodiment of a space curve is illustrated and explained in more detail in FIG. 9.

It goes without saying that the output conveyors 7 can in another exemplary embodiment also be arranged next to each other. The temporary storage device 5 will therein also have parts that in each case extend across a part of an output conveyor 7. The parts of the temporary storage device 5 are in that embodiment likewise linked to each other by a connecting part.

Irrespective of how the output conveyors 7 are specifically arranged, which is to say next to each other or one above the other, that exemplary embodiment will generally make an increased throughput rate possible. The exemplary embodiment will, though, also make it possible to reduce the speed of the output conveyors 7, for example in proportion to the number of output conveyors 7. The throughput rate of each output conveyor 7 can thus be matched to the maximum throughput rate of a following packaging or stacking device, for example through a combination of increased throughput rate and reduced speed.

In that exemplary embodiment, too, there is an area of the temporary storage device 5 that does not overlap the output conveyor beneath it.

For sorting systems based on a temporary storage device and having moving sorting compartments as part of the output conveyor, performance can be enhanced by employing a plurality of output conveyors. One aspect of the present patent application relates to a length-reduced crossover needed for that purpose within the temporary storage device from one plane to another. Two output conveyors can thereby be arranged one above the other instead of next to each other, which will result in reduced space requirements.

The performance capability that can be achieved for the sorting system is dependent on the degree of overlapping between the temporary storage device and output conveyor. Said degree of overlapping is reduced by the length of the deflection, from which its significance for the system's performance capability derives.

The possible use of a helical line will result in a longer link section as a function of the point at which the traction means is coupled to the carrying element (a pouch, for example). It is, moreover, more complex to produce.

The proposed length-reduced crossover consists of a series of three level bends, typically of 90°, and an ensuing rotation of the carrying elements. The carrying elements are in one exemplary embodiment pouches. The incoming and outgoing part of the link section are therein parallel. The first level bend is around a vertical axis, followed by a level bend around a horizontal axis. The ensuing vertical motion of the pouch serves to match link-section ducting to the height requiring to be surmounted. Following on therefrom is a level bend around a horizontal axis perpendicular to that of the first bend. The crossover is concluded by a rotation of the pouch through 90° around said crossover's direction of motion.

There will be only slight relative motion between the goods in the pouch and its walls if said goods have been deposited therein in the vicinity of its inner side. They will otherwise be aligned with said inner side wall. Throughout the entire process of crossing over between levels there will be no interim change in the side wall with which the said goods want to align themselves.

The measures described for the crossover between planes comprising a series of level bends and a concluding rotation of the pouch makes the following advantages possible:

The reduced length compared with a helical line makes a higher system throughput possible.

Aligning of the goods with the inner side of the pouch is intrinsic to the system.

Compact deflecting is advantageously combined with the use of a buffer, having two loading stations, of the temporary storage device after approximately half its circulation time (“1+1” loading mode).

Implementation can be simpler.

Figure 9:
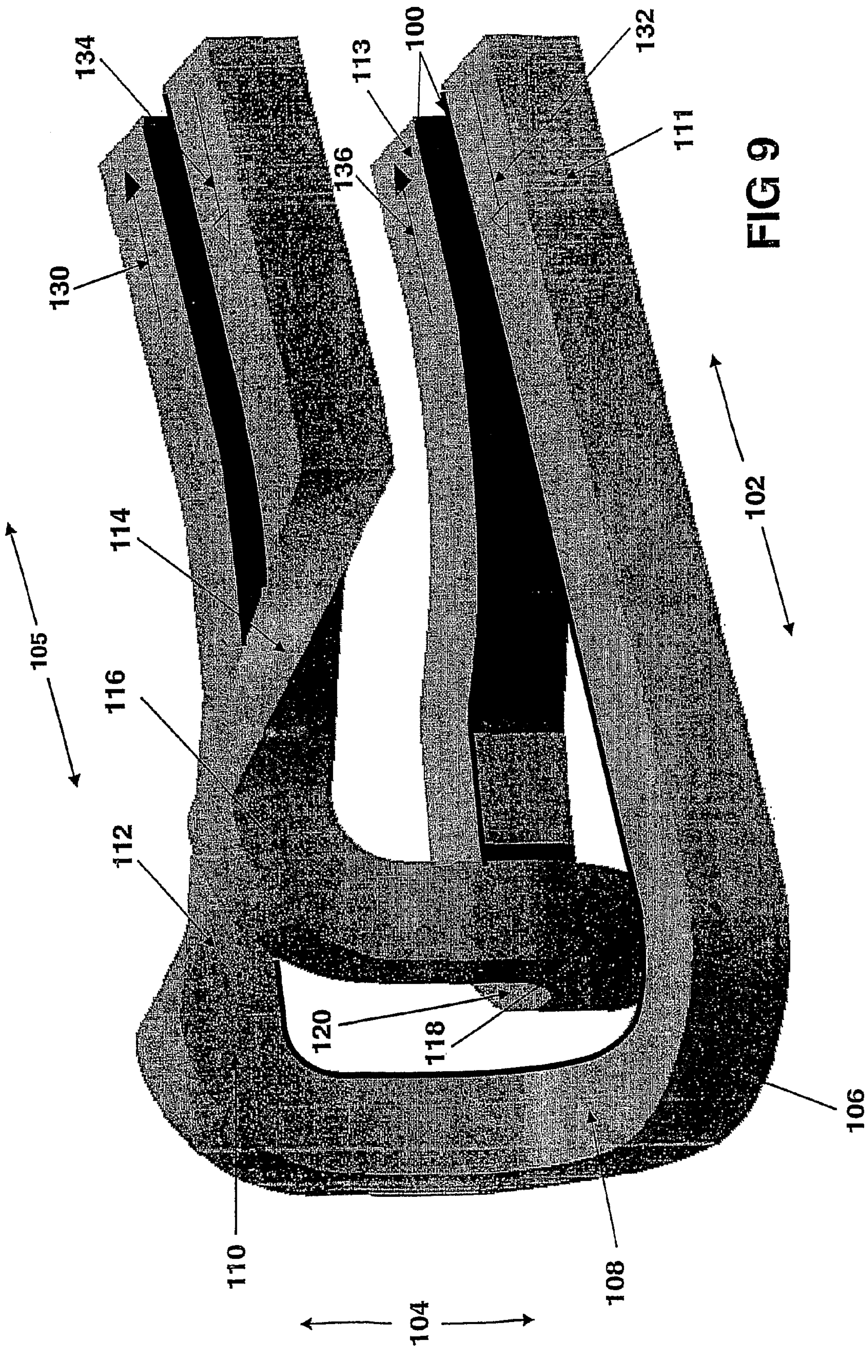
FIG. 9 is a schematic of an exemplary embodiment of an apparatus for sorting having a length-reduced crossover within a temporary storage device from one plane to another.

The vertical crossover in the temporary storage device is shown in more detail In FIG. 9. The black line 100 designates the positions of the points at which the pouches are coupled to the traction means. The position of said coupling points allows minimal deflection radii for the group of pouches and hence a minimized length for the plane crossover. FIG. 9 likewise shows the two link-section guideways 111 and 113 in the lower horizontal plane 102. The position of a second plane parallel to the plane 102 is determined by the arrow 104. Each pouch-conveying link is crossed over from one plane to the other through a series of 90° bends. The pouches are attached in the area of the line 100 to the traction means with reference to which the motion of the pouches is described. Along the line 111 in the direction of the arrow 132 the pouches first bend through 90° in the plane 102 as shown by the arrow 106. They then bend through a further 90° as a result of which the pouches are deflected from the first plane 102 into the second plane parallel thereto, shown by the arrow 108. The pouch then moves vertically until shortly before reaching the second horizontal plane, which it reaches after a further, third 90° deflection 110. There is finally a first 90° rotation 112 around the direction of motion 130, in which the pouches then continue. The second link-section guideway 113 is provided analogously in the opposite direction.

The starting direction for the following explanation is to be taken as that indicated by the arrow 134. The pouches first undergo a second 90° rotation 114 around their direction of motion immediately followed by a sixth 90° bend 116 around a horizontal axis in the plane parallel to the plane 102. The pouches thereafter surmount the difference in height between the two horizontal planes along the plane 104 and arrive at the horizontal plane 102 through a seventh 90° bend 118. That is followed by an eighth 90° bend 120, after which the pouches continue in the direction 136. Equal spacing between the two link-section guideways as in the top plane can be achieved by next combining a level right-hand and a left-hand bend. The aforementioned advantages ensue in keeping with that arrangement.

Figure 10:
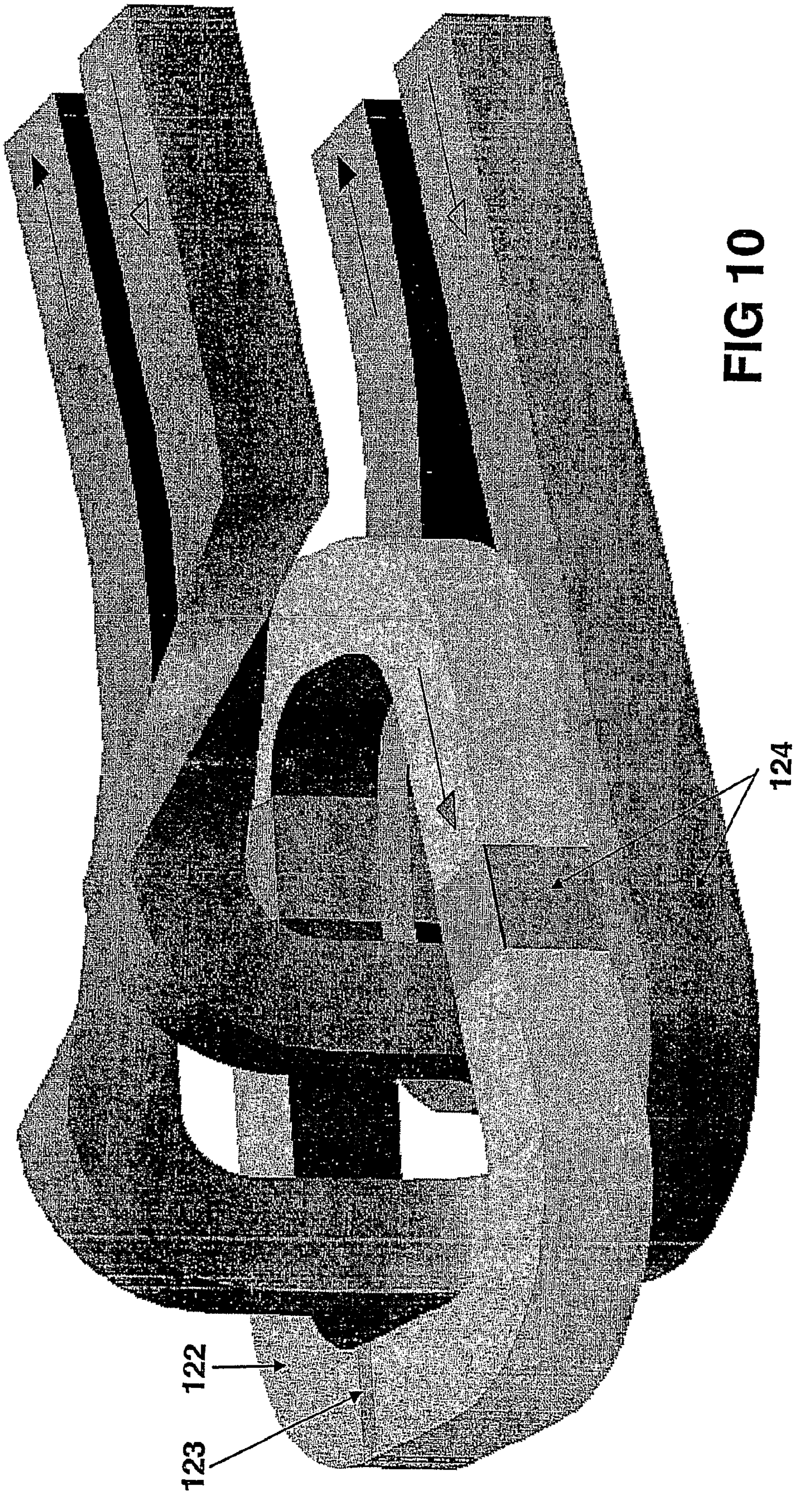
FIG. 10 is a schematic of a further exemplary embodiment of an apparatus for sorting having a length-reduced crossover within a temporary storage device from one plane to another.

The arrangement described furthermore advantageously allows an annular buffer 122 to be used, see FIG. 10. Said buffer is loaded at the location 123 and feeds the goods out into the temporary storage device at two locations 124. The pouches therein require approximately half their total circulating time between said two locations.

Figure 11B:
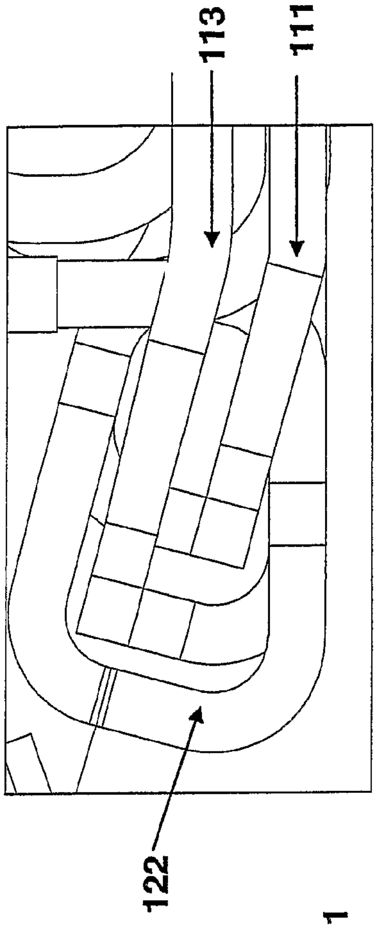
FIGS. 11*a*-11*c* are schematic top views of different exemplary embodiments having a length-reduced crossover.
Figure 11C:
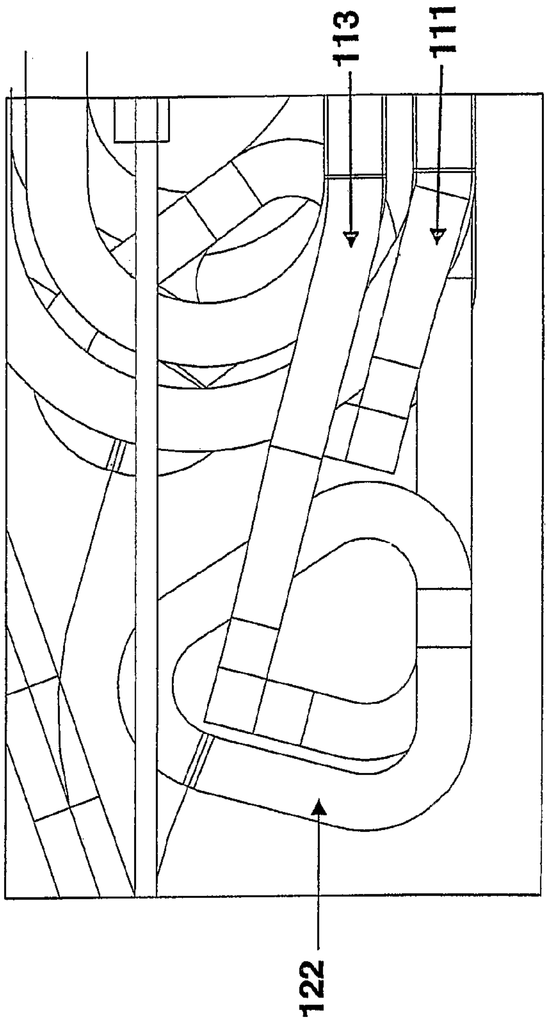
Figure 11A:
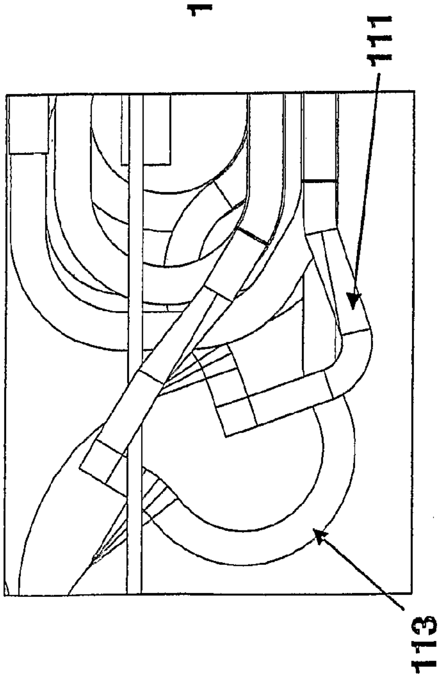

FIGS. 11*a*-11*c* are top views of different exemplary embodiments. While FIG. 11*a* has no buffer, FIG. 11*b* has one buffer and FIG. 11*c* two buffers. In both latter cases in each case two transfer points from the buffer into the temporary storage device are provided for implementing a “1+1” loading mode. The various components have been numbered the same in all figures.

Figure 12A:
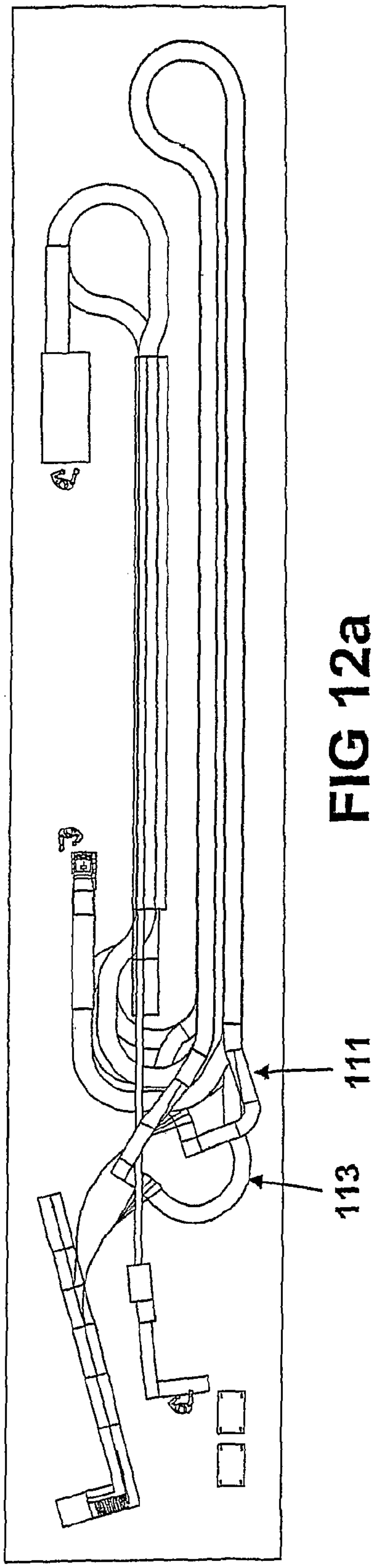
FIGS. 12*a*-12*c* show an exemplary embodiment of an implementation of the arrangements shown in FIG. 10 in a sorting system.
Figure 12B:
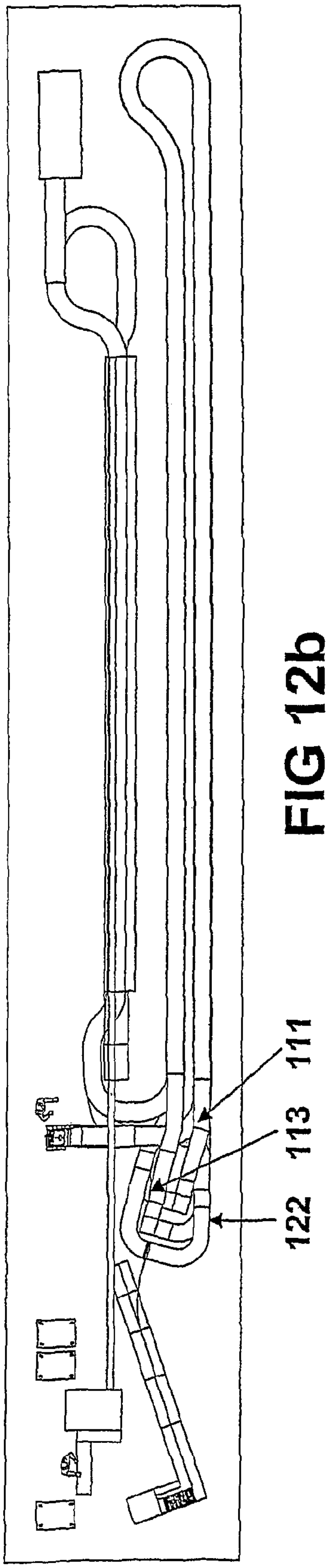
Figure 12C:
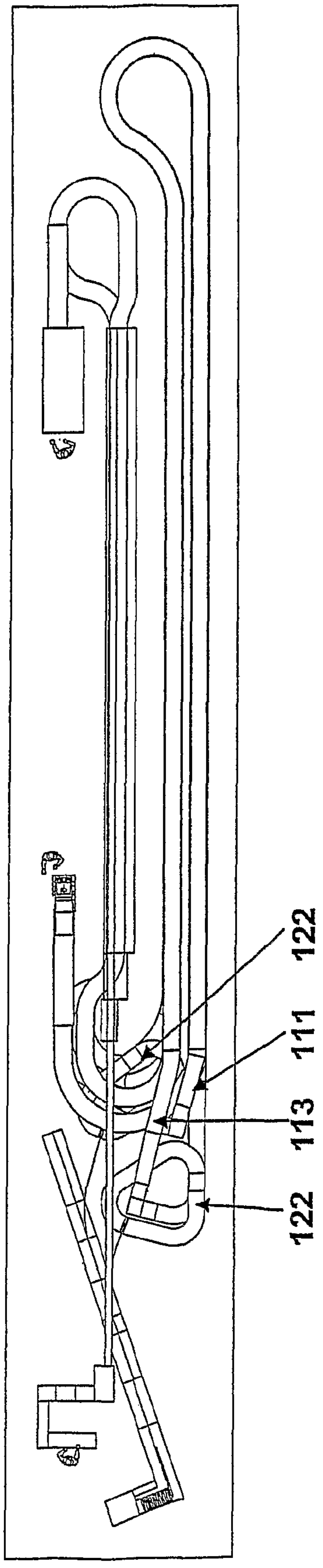

FIGS. 12*a*-12*c* show the implementation of the arrangements shown in FIG. 10 in a sorting system. The system’s scalability is within the scope of customary design practice and does not limit the scope of the inventive application.

FIGS. 13*a*-13*f* illustrate a further aspect of the system shown in FIG. 1. Machines based on a temporary storage device are less suitable for letter processing since, compared to a pinch-belt system, transportation by means of a temporary storage device takes place at a significantly reduced throughput rate. Because of that, a separate process unit for letters is proposed that has to perform two functions: One is to sort the letters belonging to one delivery point into a sorting compartment as the final partial process in carrier sequencing; the second is to feed out the resulting letter volume for each delivery point onto the output conveyor system. That exemplary embodiment therefore relates to said two functions.

No sorting system for large letters (flats) that is based on a temporary storage device and processes letters in a separate partial system has hitherto be made known.

The output conveyors 7 serve not only to combine the mail items from the temporary storage device 5 but also to combine them with letters. Sorting compartments for letters are for that purpose located above the temporary storage device 5, specifically such that one output conveyor 7 will move along below the sorting compartments. Each sorting compartment is therein assigned to one delivery point.

A loading device fills the sorting compartments for letters independently of and separately from the temporary storage device 5. The number of sorting compartments is therein selected such that the second or final pass of a multi-stage sorting process can be transferred to the apparatus shown in FIGS. 13*a*-13*f*.

When all the letters for the sorting compartments have been transferred thereto, the sorting compartments will be emptied by transferring their contents to the output conveyor 7 moving beneath them.

FIGS. 13*a*-13*f* show a schematic DPP system having two vertically arranged output conveyors. Said DPP system is based, as described above, on a temporary storage device 5. The DPP system has in the embodiment shown a group of sorting compartments on each of the two planes. An output conveyor is in each case located beneath the sorting compartments.

The described process, namely a suitably adapted subsystem for processing letters, offers the advantage, inter alia, that a high performance capability can be achieved because, for letter processing, the processing device for large letters is circumvented.

FIGS. 13*a*-13*f* illustrate a further aspect of the system shown in FIG. 1. The subsystem described in the foregoing is for that purpose embodied in such a way as to perform two functions, namely filling separate sorting compartments for letters as part of a sorting process, with the mail items for one delivery point being allocated to one sorting compartment and the stacks in each sorting compartment being transferred onto an output conveyor. In an exemplary embodiment a second group of sorting compartments is used for that purpose. If there are two planes, then each will be assigned a second group of sorting compartments. To enable continuous operation, said groups are filled and unloaded in alternating fashion, meaning that while one group of sorting compartments is being filled, the alternative group of sorting compartments belonging thereto is emptied by transferring the letters to the output conveyor.

Two groups of sorting compartments are thus employed in the exemplary embodiment shown. Said groups are referenced in FIGS. 13*a*-13*f* as Bin Set 1 and Bin Set 2. The temporal sequence of transferring to the output conveyor 7 (which is to say emptying of the sorting compartments) and filling of the sorting compartments is illustrated by way of example in said figures for one plane. Shown in FIGS. 13*b*-13*f* above the illustrated sorting compartments are lines for the respective status of a set, with the first set’s status (Status Bin Set 1) being shown above the second set’s status (Status Bin Set 2).

FIGS. 13*a*-13*f* therein each show two alternately arranged sets of sorting compartments referenced here for descriptive purposes as Red (R) and Blue (B). Each set of sorting compartments here comprises 30 sorting compartments referenced in each case as R1-R30 or, as the case may be, B1-B30. For clarification, the sets are arranged above the output conveyor 7 that moves from left to right. The letter containers are therein intended to be arranged in descending order in the direction of letter transportation (in this case descending from left [R30, B30] to right [R1, B1]). Higher sorting-compartment numbers are therein assigned to higher delivery-point numbers of the groups of 30 delivery points.

Figure 13A:
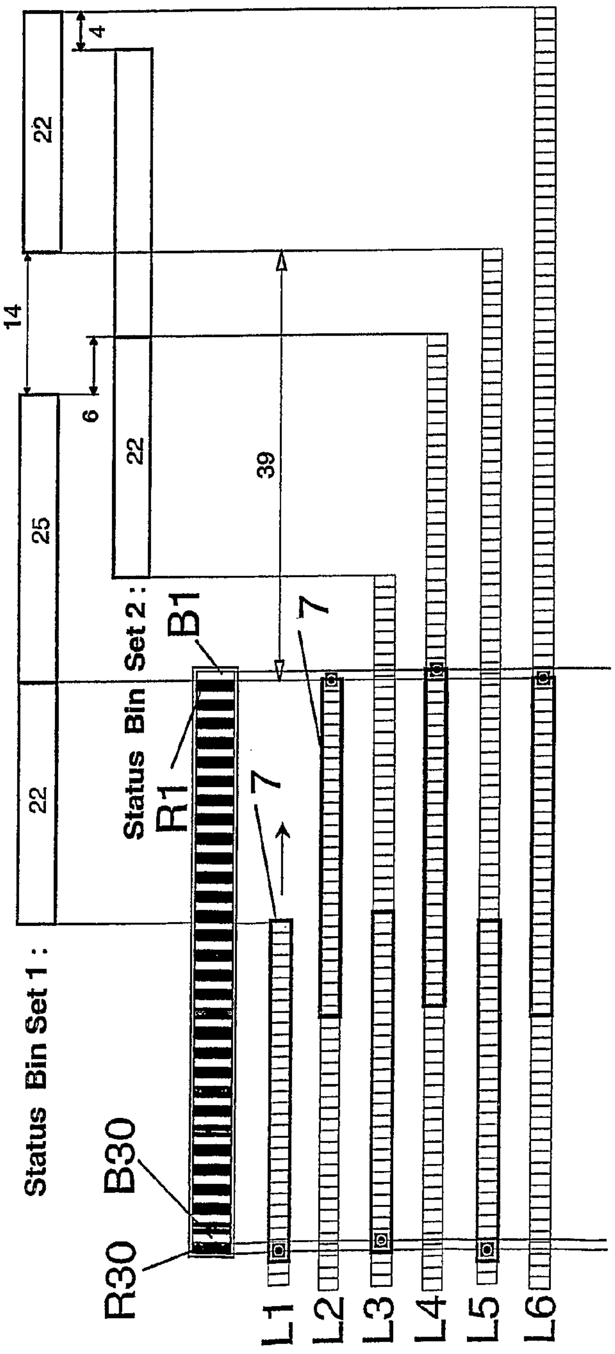
FIGS. 13*a*-13*g* are schematics of the use of two sets of letter containers (bins)
Figure 13B:
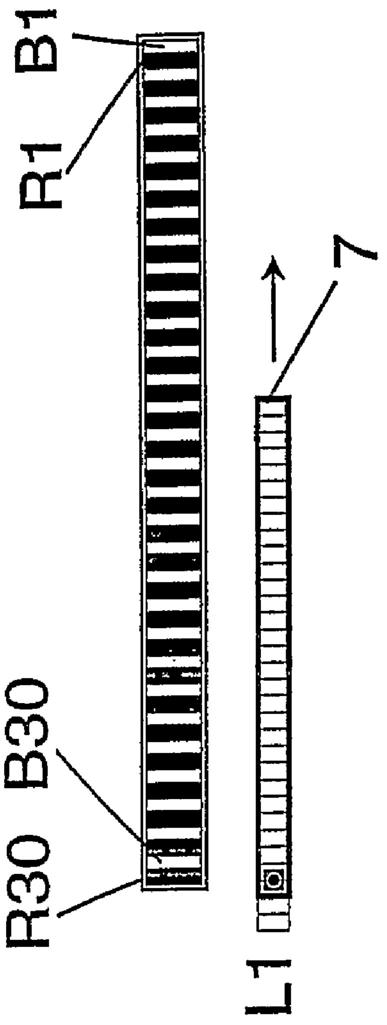
Figure 13C:
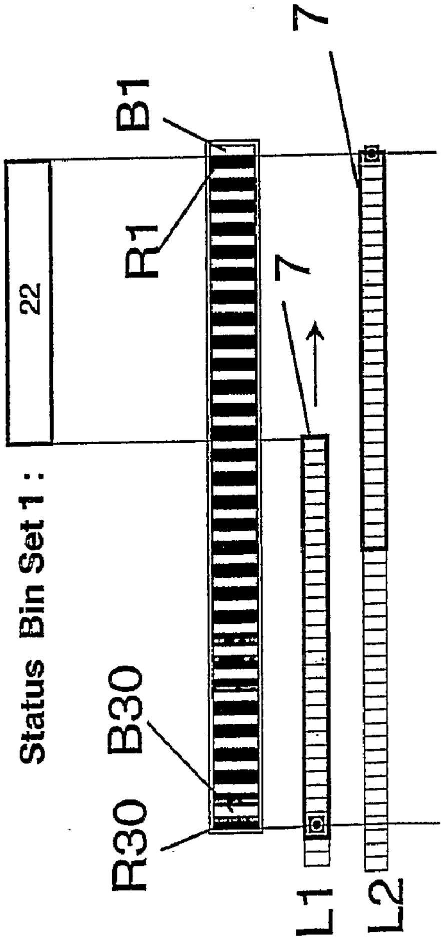

FIG. 13*a* illustrates in line L1 beneath the output conveyor 7 its position in which the contents of the sorting compartment R30 are transferred to the output conveyor 7. In FIG. 13*b*, line L2, the output conveyor 7 has moved to the right and was while doing so filled with the contents of the sorting compartments R1-R29 so that the contents of 30 sorting compartments R1-R30 are on the output conveyor 7. The first set is thus for a period of, for instance 22 s, in the transfer status. All mail items allocated to said group of delivery points must already have been sorted into the sorting compartments when transfer begins. The first set will according to FIG. 13*c* thereafter be in the loading status, for example for 25 s.

Figure 13D:
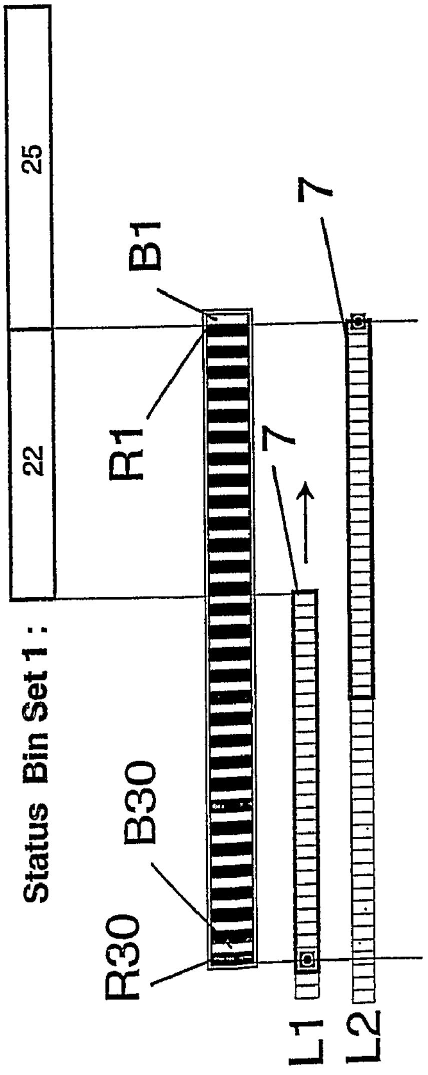
Figure 13E:
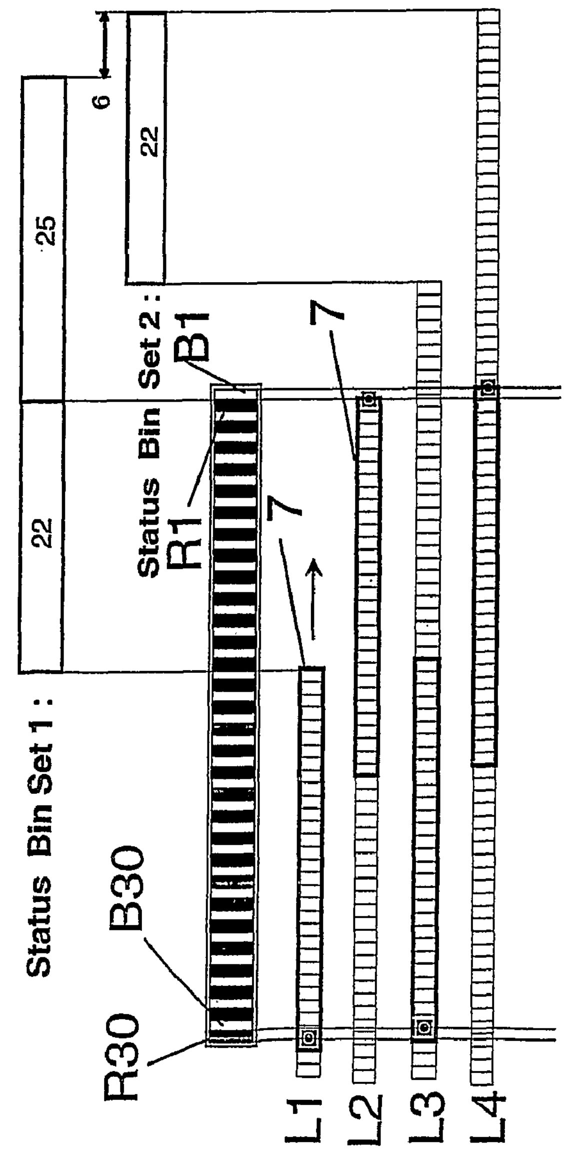

FIG. 13*d* shows in line L3 that the blue sorting compartments B1-B30 start being transferred to the output conveyor 7 approximately 9 s after all red sorting compartments R1-R30 have been emptied. The blue containers will thus be in the transfer status until all blue sorting compartments B1-B30 have been emptied (line L4). According to FIG. 13*e* the second set will thereafter be in the loading status, for example for 25 s.

Figure 13F:
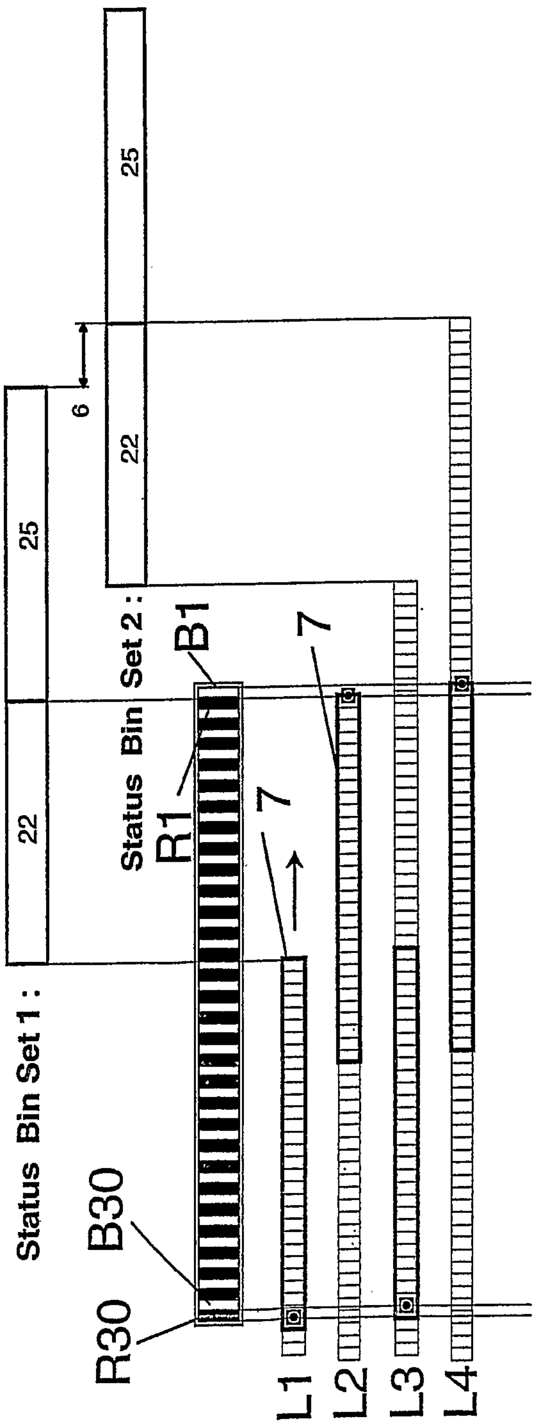
Figure 13G:
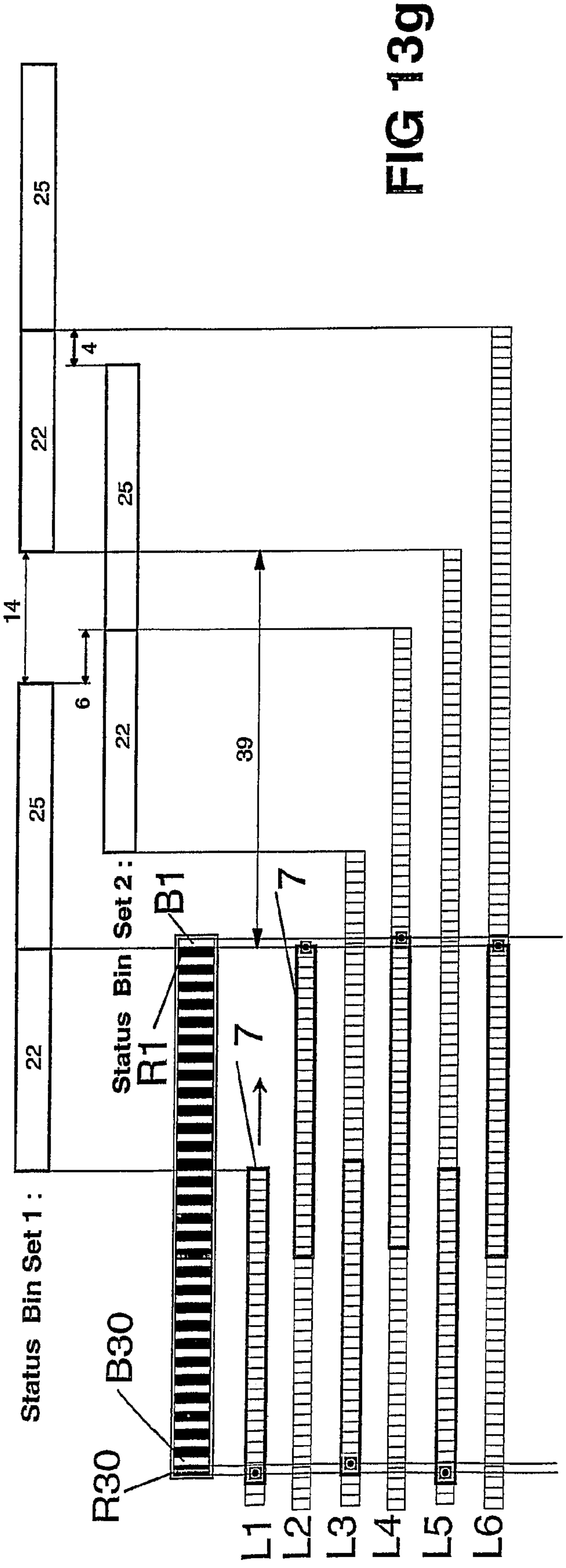

FIGS. 13*f*-13*g* illustrate in lines L5, L6 that the two sets' transfer operations shown in FIGS. 13*a*-13*e* are repeated. In an exemplary embodiment the time between two transfers for a set is 39 s. FIGS. 13*f* and 13*g* illustrate also that in the exemplary embodiment shown a pause can occur in the singling module for letters, for example when the first set has been loaded the pause up until when the second set starts being loaded will be a few seconds, for instance around 4-6 s. Said singling pause will not, though, reduce the system's throughput rate because that is determined by the output conveyors.

The above-described method insures a maximum period of time for refilling, which is to say a maximum pause on the part of the singling module at a given throughput rate for the output conveyor. That can be understood as being a safety reserve for also allowing above-average volumes of mail items in a set to be processed. The exemplary embodiment described is based on the use of only two sets of sorting compartments that are alternately filled and emptied.

Figure 14:
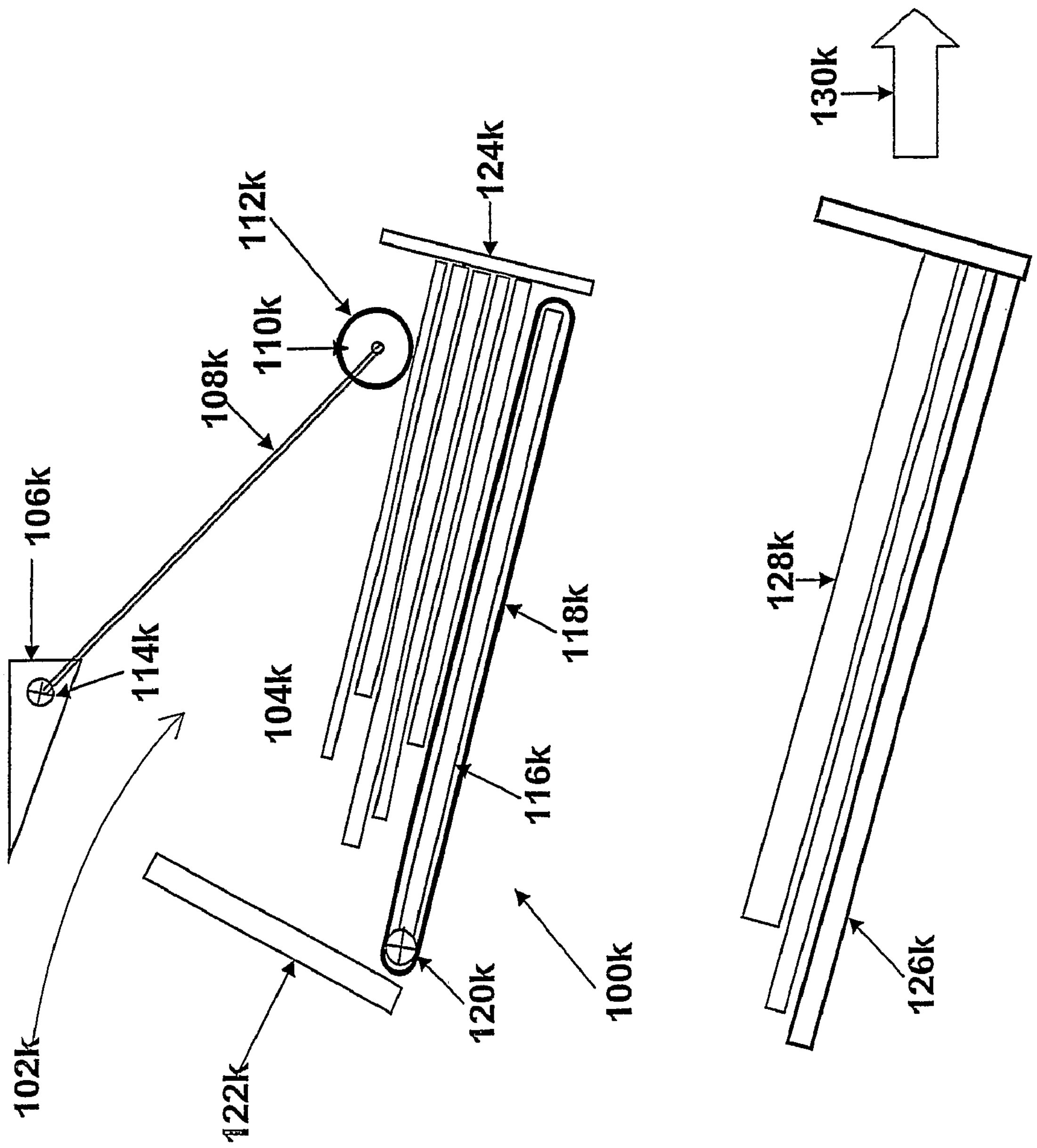
FIGS. 14 and 15 show a schematic exemplary embodiment of a letter receptacle.
Figure 15:
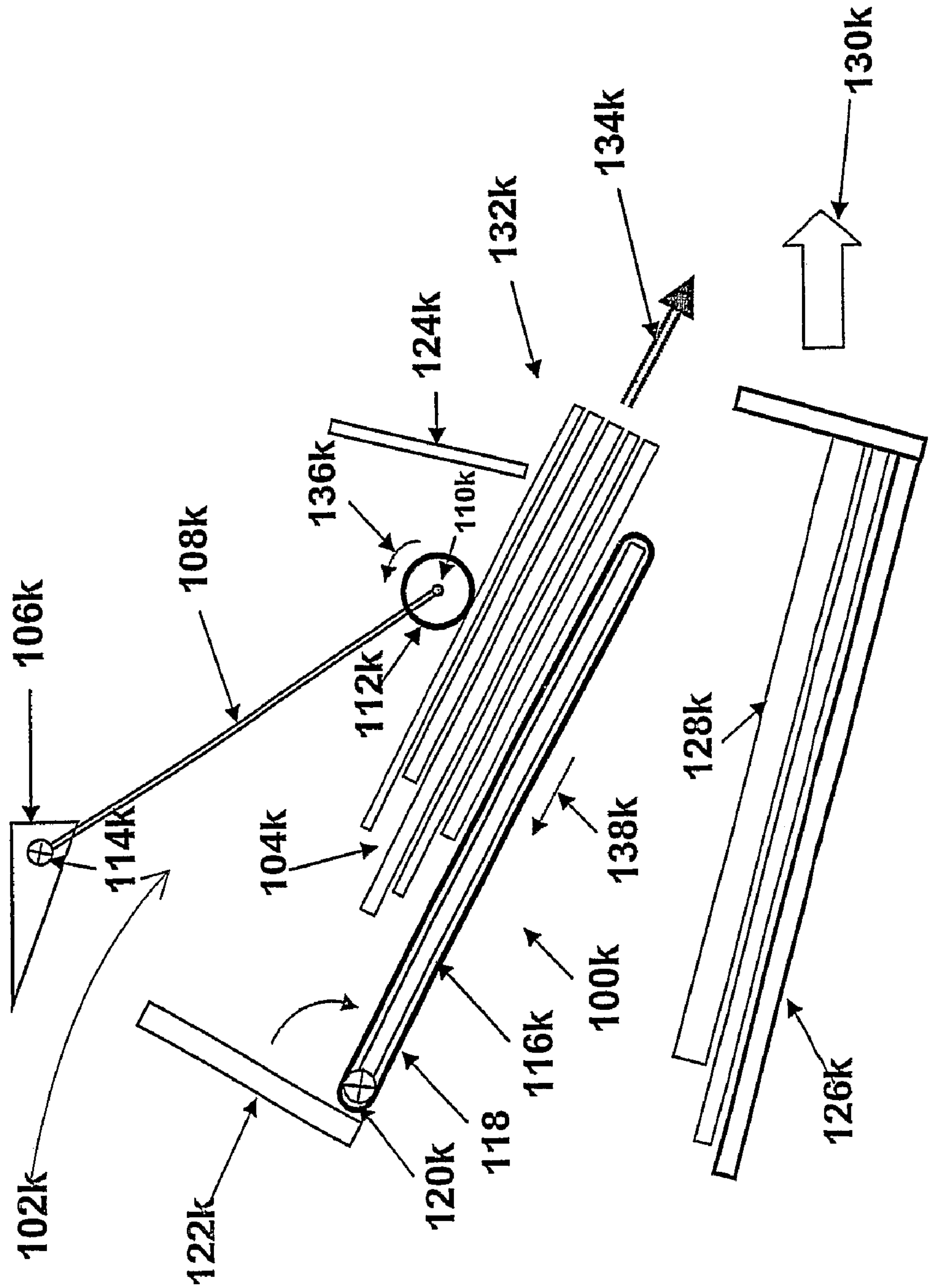

FIGS. 14-15 illustrate a further aspect of the system shown in FIG. 1.

The sorting compartment here presented includes the following characteristics for the additional operation of transferring onto the output conveyor. The apparatus consists of a compartment base that can fold out downward, thereby opening the sorting compartment. Said base can be operated in its pivot above by means of a drag lever attached to the top side of the stack and can be resettable by way of a resilient force. The compartment base is provided with a driven underfloor belt for actively accelerating the letter stack, supported by the force of gravity. Stack accelerating can be additionally supported by a driven roll located at the top of the stack on the drag lever. The stacking compartment can be suitably tilted for insuring an edge alignment of the stack. A corner alignment can be achieved through an additional tilting of the stacking compartment. The proposed solution enables a stack of letters to be transferred automatically to an output conveyor located beneath the stacking compartment. Owing to the kinematic characteristics, the angle of the stacking-compartment base will advantageously be larger while the stack is being transferred than during the process of stacking into the stacking compartment.

The proposed stacking compartment is described in more detail by FIGS. 14 and 15. As is shown in FIG. 14, the stream of letters 102, indicated by the arrow 102, discharged from the main stream ends in the stacking compartment 100. A drag lever 108 having a drivable roll 110 turns around the pivot 114 as part the letter separator 106 in keeping with the fill level of the stacking compartment and with the angle of the compartment base. The roll 110 located on the drag lever is provided with a frictionally engaged running surface opposing the letters so they will be accelerated when the roll is driven. The roll drive 110 and the driven rotation of the drag lever are familiar to a person skilled in the relevant art.

The stacking compartment includes a base 116 having an underfloor belt 118 that is driven by one or both of the diverting rolls. The specific embodiment is for a design engineer to choose. The axis of one of the diverting rolls therein serves also as the pivot 120 of the base 116 around which said base can swivel up and down. The sorting compartment 100 further consists of a front wall 124 and a rear wall 122 between which the base is located. All three walls thus form the sorting compartment for accepting letters.

Underneath the sorting compartment is a conveying device which in one exemplary embodiment can consist of individual trays 126 having large letters and unaddressed mail items already deposited thereon. The conveying device moves from left to right according to the arrow 130 that has been drawn. The sorting compartment 100 is stationary; it is not moved. The number thereof depends on a chosen design. The function of the above-described device is to feed out letters 104 from its sorting compartment 100 onto the conveying device 126 on which large letters and further mail items 128 for this delivery point can already be located.

The combining process can be seen in FIG. 15. The sorting-compartment base 116 has been swiveled downward around its pivot 120 so that a gap 132 forms between it and the front wall 124. The underfloor belt 118 and the roll 110 are then driven in the same direction so that the letters will be deposited through the gap 132 on top of the mail items 128 on the conveying device moving underneath the sorting compartment. As can be seen from FIG. 15, the roll 110 for that purpose turns counterclockwise 136 while the underfloor belt 118 turns clockwise 138. The simultaneous motion of the roll 110 and the underfloor belt 118 accelerates the letters 104 from their sorting compartment 100 through the gap according to the arrow 134. The drive arrangements necessary therefor are familiar to a person skilled in the relevant art.

The fundamental problem associated with sorting systems based on a temporary storage device is that the number of mail items requiring to be carrier-sequenced can exceed the number of storage units that can be used. That shortcoming of critical import for all carrier sequencing can according to the invention WO 2005/025763 A1 be resolved by producing sufficiently small batches having continuous sections of delivery points. What is characteristic of said process is that an initially segregated volume of mail items that has to be processed in one or more separate process steps is minimized.

A further embodiment of the patent application describes an arrangement requiring only reloading of a temporary storage device with the segregated volume of mail items, not repeated singling of the mail items. No arrangement or machine has become known where the entire volume of mail items does not have to be reprocessed. Moreover, with a tree-sort method of that type it is necessary to know the volume distribution across the delivery points.

The proposed arrangement consists of two largely mirror-image machines according to FIG. 1 that are arranged laterally mutually displaced. Each of the two machines corresponds to the system shown in FIG. 1, expanded to include a device for singling unaddressed mail items and a device for loading them onto one or more output conveyors in front of the overlapping area of the temporary storage device and output conveyors.

To minimize said double arrangement's overall space requirements the course of the buffer, temporary storage device, and output conveyors is mirrored axially symmetrically, with the directions of circulation by contrast remaining clockwise.

Figure 16:
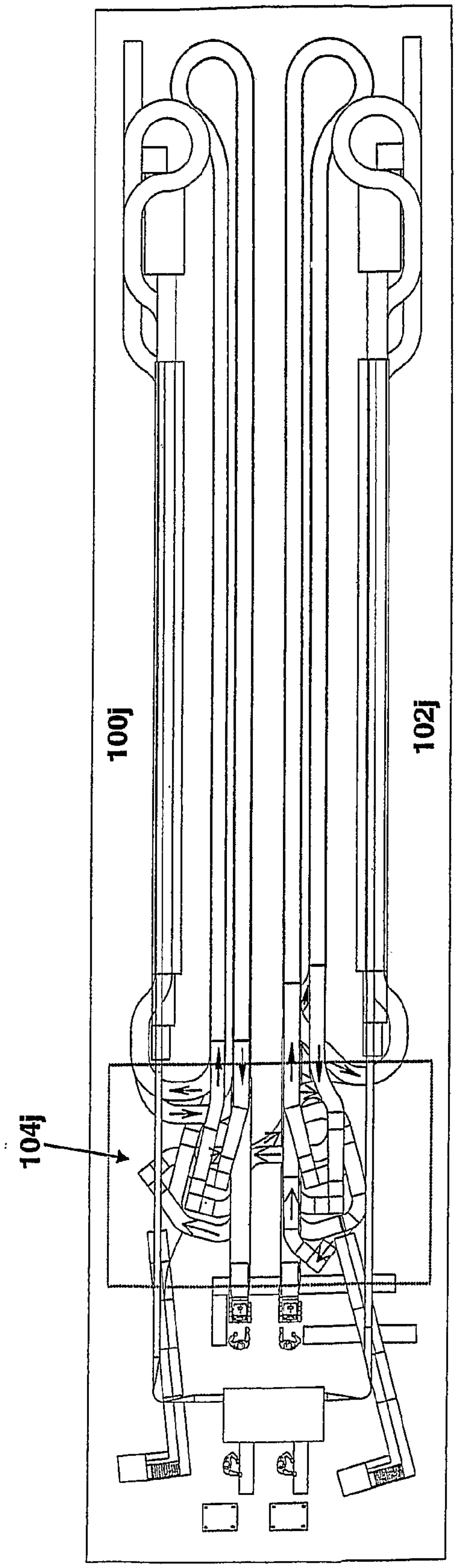
FIG. 16 is a schematic of an exemplary embodiment of an apparatus for sorting having two sorting devices.
Figure 17:
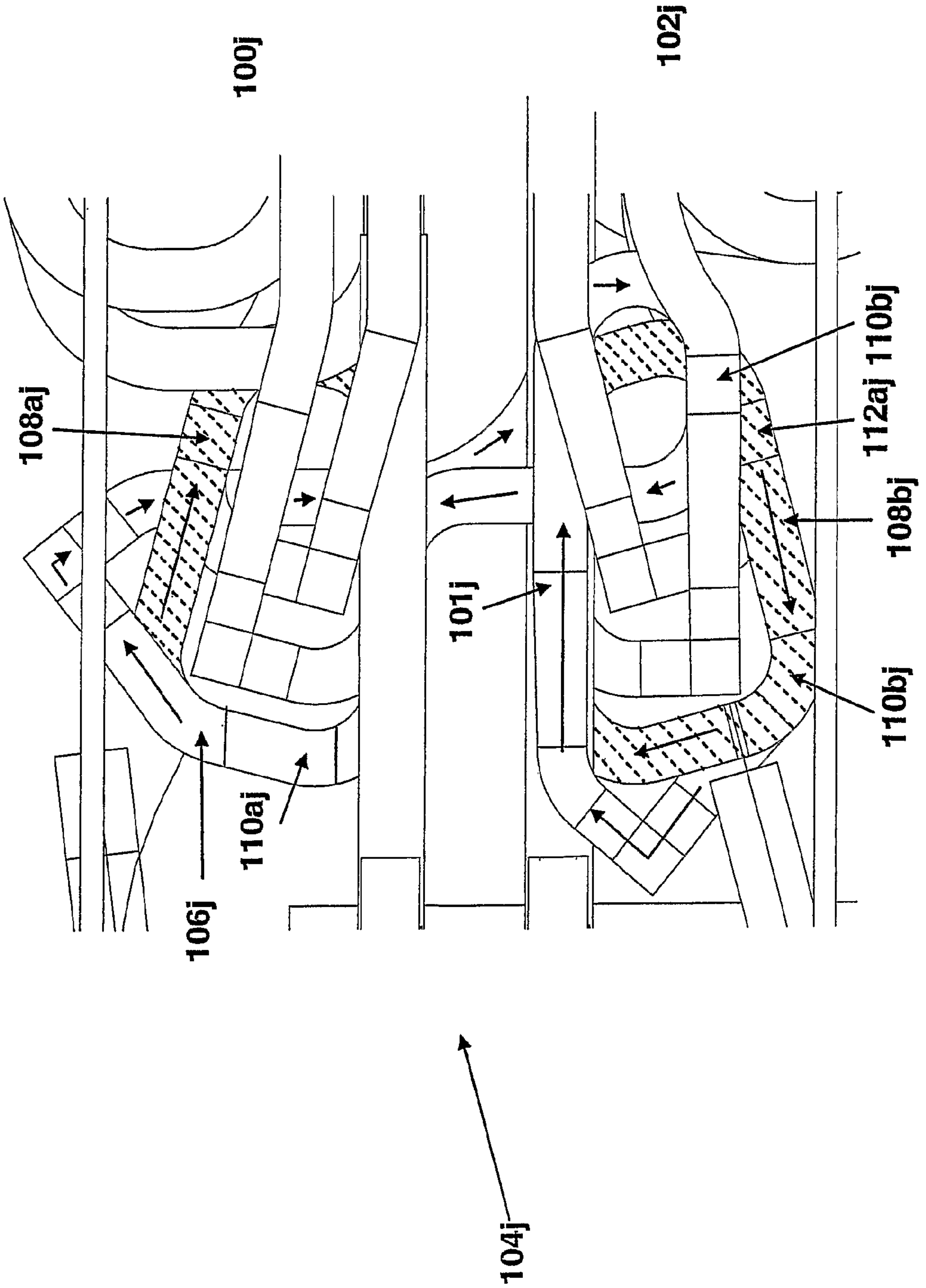
FIG. 17 is a detailed representation of the apparatus shown in FIG. 16.

As shown in FIG. 16, the two machines 100 and 102 can be connected to each other via one or more conveying devices in the area of the buffer(s) 104, as shown in more detail in FIG. 16. The autonomous link conveying device 106 logistically links the machine 102 to the machine 100 in the area of the temporary storage device 108*a* and 108*b* of both machines. In the non-shaded areas the buffer 108*a* moves underneath other conveying devices. The link conveying device is loaded in an area 110*b* from the buffer and, in an area beneath it that is not visible, from the temporary storage device of machine 102 and in the area 110*b* from the buffer of machine 102. The link conveying device is unloaded into the temporary storage device 108*a* of machine 100 in the area 110*a*. The two loading areas from the temporary storage device (110*b* and, not visible, the second) are located directly in front of the two loading stations 112*a* and X (concealed by the buffer 108*b*) of the temporary storage device of machine 102.

Thus the volume of mail items that is not included in the batch size having a continuous range of delivery points which is to be processed by the machine can be loaded automatically into the buffer 108*a* of another machine 100 without-requiring an additional singling process. Said volume of mail items will then be further processed on said machine 100.

The volume of letters belonging to said further-processing operation is redirected automatically by the singling device for letters of machine 102 into the letter-processing system of machine 100 using a corresponding crossover unit.

The volume of unaddressed mail items belonging to said further-processing operation will continue being singled not by the corresponding apparatus of machine 102 but by that of machine 100. The two apparatuses are for that reason arranged next to each other.

The described arrangement consisting of two logistically coupled machines exhibits the following characteristics:

Largely mirror-image link ducting in the two machines allows space requirements to be minimized with no changes being required to subsystems.

Having adjacently arranged singling and loading devices for unaddressed mail items allows better use to be made of the operators.

Having one or more logistical link conveying devices between the machines makes it possible also to process batch sizes that exceed the temporary storage device's storage capacity without requiring an additional processing operation.

The most favorable link from machine 102 to 100 takes over the mail items from the temporary storage device of machine 102 in each case just in front of the two loading areas of the temporary storage device and from the buffer of machine 102 just in front of the buffer's loading area, and discharges them again into the buffer of machine 100 just in front of the buffer's loading area.

The most favorable embodiment of a link conveying device will allow functionally comparable logistical chaining additionally from machine 100 to machine 102.

The necessary networking of the two letter-singling modules with both machines' two letter-sorting subsystems will also result in a letter-sorting system having double the number of available letter-sorting compartments accompanied by a doubling of the throughput rate as compared with a single machine. That is of major significance for letter-sorting processes that have been brought ahead in time, for example ahead of the first sorting pass within a carrier-sequencing process.

Figure 18:
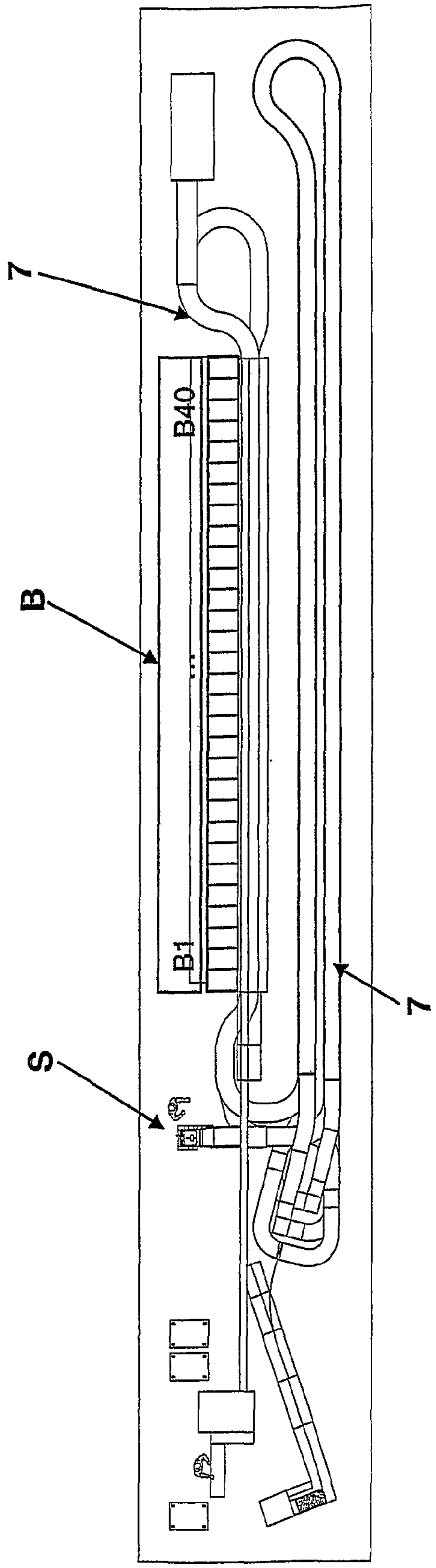
FIG. 18 is a schematic of an exemplary embodiment of an apparatus for sorting having means for processing unaddressed mail items.
Figure 19:
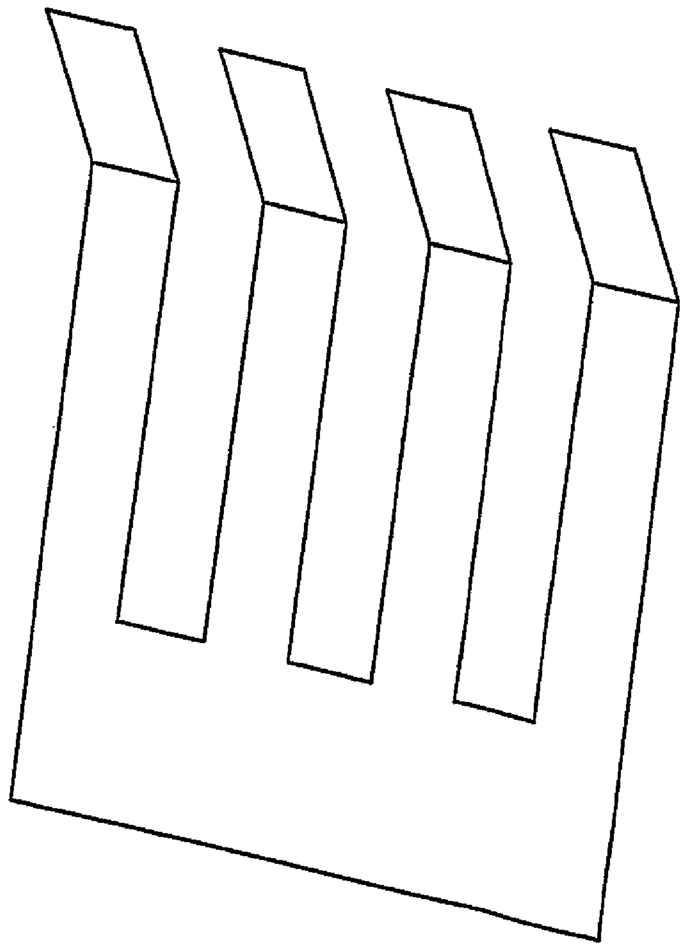
FIGS. 19-21B show a schematic exemplary embodiment of a comb-type removal apparatus.
Figure 20A:
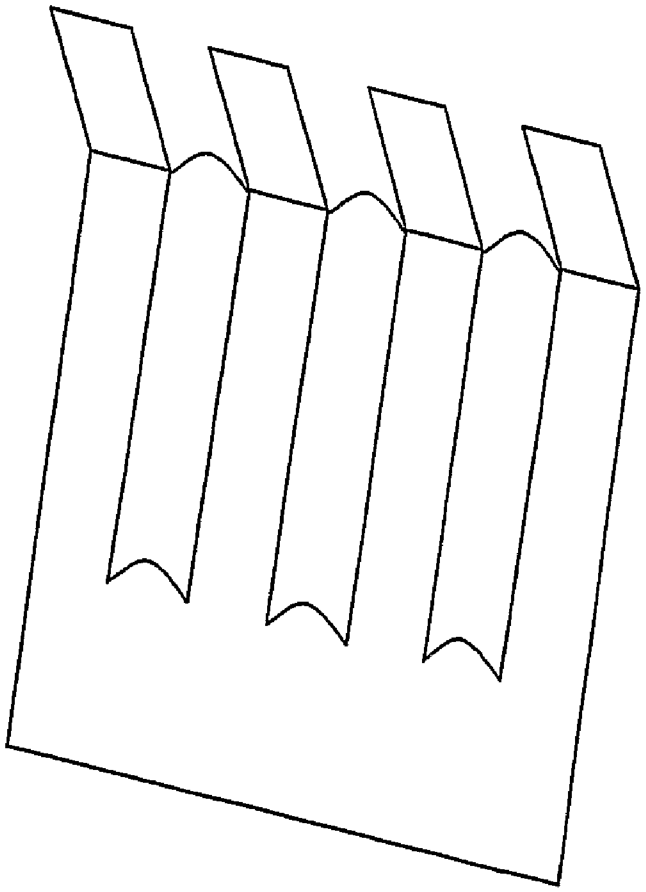
Figure 20B:
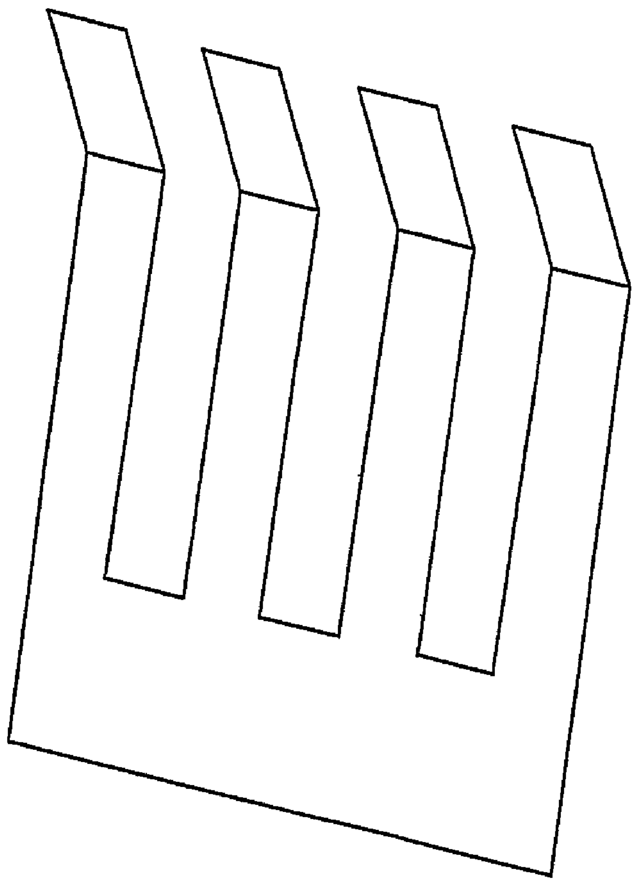

FIG. 18 is a schematic of an exemplary embodiment of an apparatus for sorting unaddressed mail items. The apparatus shown has a station at which the unaddressed mail items are routed generally as a stack manually or by a loading device to the individual conveyor elements of the output conveyor 7. Arranged along said output conveyor 7 in a specific segment thereof are a number of output locations to which the unaddressed mail items are transferred. There can in an exemplary embodiment be 40 output locations. If each mail-delivery operative has been allocated one output location, then the mail items can by means of said output conveyor be presorted among 40 mail-delivery operatives. The individual output locations can each be connected via a further active or passive transporting system (a conveyor belt or chute, for example) disposed at right angles to the output conveyor 7 to corresponding containers for accepting the stacks or to an area in which said stacks are suitably prepared for automatic singling and packaged.

Depending on the specific type of output conveyor 7 used, transfer to the output location takes place either nearly vertically or nearly horizontally. Depending on the specific embodiment, transfer can take place ballistically. The stacks of unaddressed mail items on the output conveyor 7 can be transferred horizontally by a mechanism controlled by a control device to the respective output location, or they will be transferred vertically to an output location located beneath it. If the stacks of mail items are located on individual trays or in individual shells, then the control device will, for example, for that purpose turn in each case one support means in such a way that the stack of mail items will when located above the required output location slide downward from the support means counter to its direction of motion. Each type of advertising mail will at the end of processing have been allocated to a mail-delivery operative, meaning that each mail-delivery operative will have been allocated for example a multiplicity of items of advertising mail from the major customer A and a multiplicity of items of advertising mail from the major customer B.

Figure 21A:
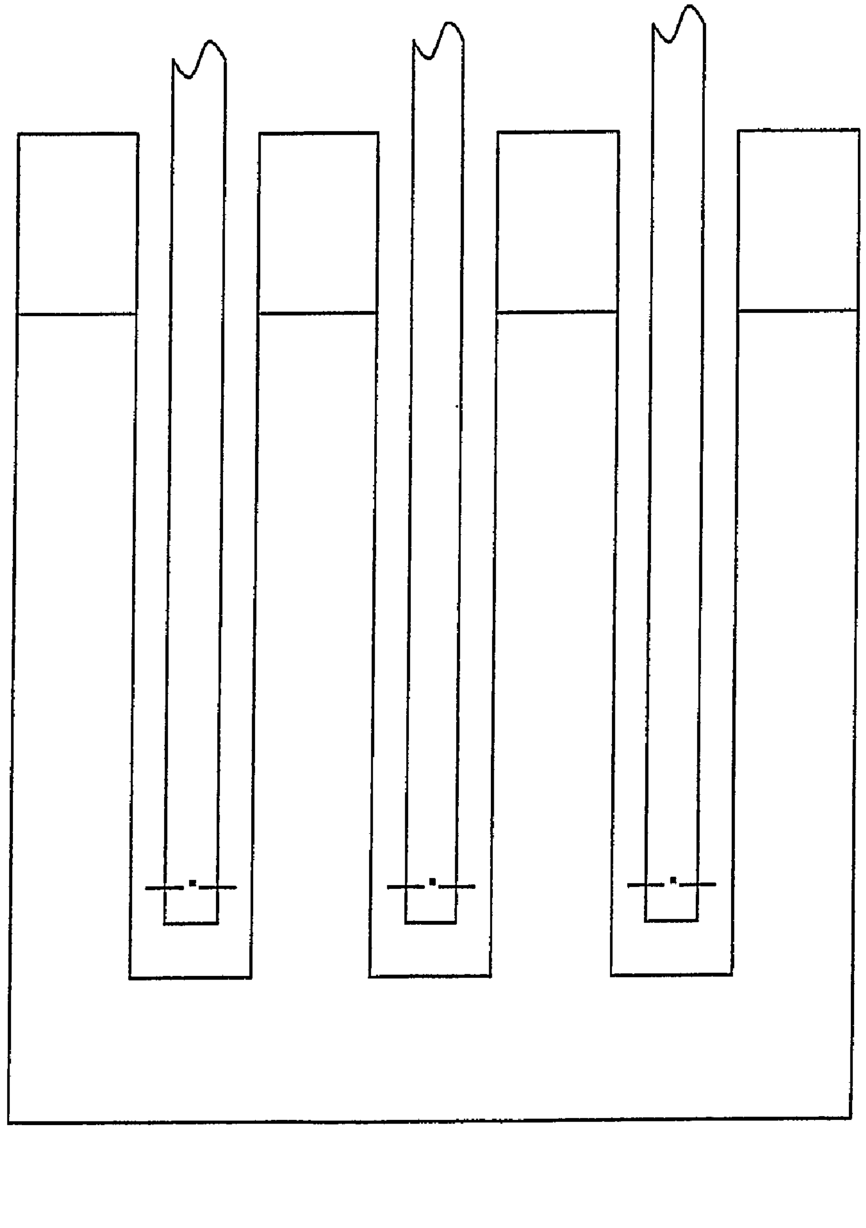
Figure 21B:
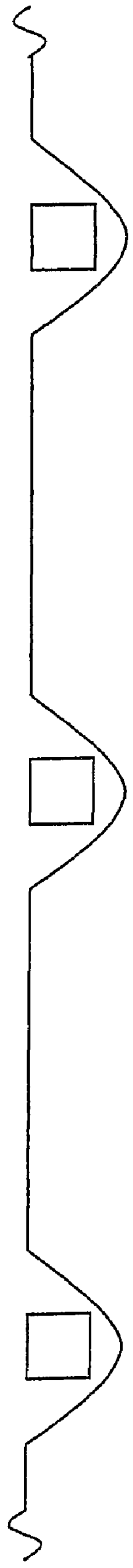

The function shown in FIG. 21 of processing unaddressed mail items can be applied in an apparatus having one output (FIG. 2-FIG. 7) or in an apparatus having two outputs (FIG. 8). It goes without saying that the sorting of unaddressed mail items can in a structure having two outputs also take place at a faster throughput rate or for more output locations.

For unloading hitherto known shell conveyors for flat mail items the shell is tilted and its contents slide under the force of gravity from the shell into a destination location.

The goods requiring to be sorted can be routed onto the tilting shell either individually or as a stack.

In the case of the OMP, stacks of mail items are gathered together on a shell conveyor and then routed to an extractor unit.

The shells are tilted in the conveying direction to produce an optimal stacking scenario (aligning along the tied side of the mail items) during discharging from a pouch sorter.

Tilting shells are not suitable for achieving continuous emptying of the shells at a high conveying speed without crucially reducing the stacking quality for ensuing packaging processes. Shells tilting to the side would, owing to the undefined sliding action, seriously disrupt the stacking scenario.

A solution for an active and defined removal of mail items from tilting shells is not known.

The aforementioned problem is resolved by means of the following technical features:

- The transporting shells are tilted in the conveying direction. That results in weight-driven aligning on the tied edge:
- The transporting shells have a stopping edge (tied edge of the mail items) for aligning the mail items in a defined manner;
- The transporting shells have recesses or are embodied as a fork;
- The shells' carriage travels during unloading along a downward curving circular path and with the shells being turned so that fork-shaped narrow transporting belts can travel underneath the stack of mail items and continuously take over the stack of mail items; and
- the transporting belts taking over said stack are embodied as sectional conveyors and route the stack of mail items to a packaging unit.

The main advantage of the present solution lies in the continuous, jolt-free, and controlled transferring of mail items and stacks thereof from a shell conveyor onto another transporting system at high speed.

The exemplary embodiments described in the foregoing can of course be varied by a person skilled in the relevant art in keeping with the specific conditions prevailing. If one singling device does not deliver the necessary throughput rate, for example, then a plurality of singling devices 1 can feed the buffer pouches 3 in parallel.

The invention claimed is:

1. An apparatus for arranging flat mail items into a specifiable sequence of delivery points assigned to recipient addresses, comprising:

- at least one singling device having in each case a following read device for determining address information located on the mail items,
- a circulating temporary storage device serving at least two output conveyors and having a multiplicity of pouches configured to be opened downward in a controlled manner and permanently connected to said at least two output conveyors, with the mail items being transportable from each read device to in each case one pouch-loading station at which the mail items are loaded into in each case one empty pouch for sorting,
- said at least two output conveyors for accepting the mail items from the pouches of said circulating temporary storage device, with each output conveyor further transporting the mail items to a stacking device, with each of said at least two output conveyors having segments and moving relative to the circulating temporary storage device, with in each case a part of said at least two output conveyors being disposed beneath an overlapping area of the circulating temporary storage device, with a transporting speed and direction of said at least two output conveyors being matched to a transporting speed and direction of the circulating temporary storage device such that each segment of said at least two output conveyors passes by each pouch of the circulating temporary storage device at least once while moving along the overlapping area, and with the mail items being emptied onto respective ones of said at least two output conveyors from the pouches of the circulating temporary storage device in keeping with the read recipient addresses in such a way as to exit said at least two output conveyors in the stacking device in the specified sequence of the recipient addresses.

2. The apparatus as claimed in claim 1 wherein located between the circulating temporary storage device and said at least two output conveyors is a further temporary storage device circulating relative to the circulating temporary storage device at a different transporting speed and/or in a different direction and whose pouches accept mail items from the circulating temporary storage device and feed them out to said at least two output conveyors in the overlapping area.

3. The apparatus of claim 1, wherein located between a read device and the circulating temporary storage device is a buffering device having circulating buffer pouches for accepting the read mail items, with the read mail items being in each case able to be loaded at the pouch-loading station into the buffer pouches which feed out the mail items in a controlled manner in at least one output to empty pouches of the sorting circulating temporary storage device, with the conveyor means of the buffering device circulating in the same direction as the temporary storage device but at a different transporting speed.

4. The apparatus as claimed in claim 3 wherein the buffer pouches are configured to couple to a circulating, endless conveyor means and to decouple therefrom.

5. The apparatus of claim 1, wherein the circulating temporary storage device and said at least two output conveyors circulate counter to each other.

6. The apparatus as of claim 1, wherein located above the parts of an output conveyor that lie outside the overlapping area are devices for loading further mail items requiring to be distributed among the respective recipient addresses onto the segments assigned to the recipient addresses.

7. The apparatus of claim 1, wherein sensors for measuring a thicknesses of the mail items are provided, the mail items are emptied into a segment of a collector belt only up to a specified maximum overall height, and, if required, the bordering segments are loaded with mail items belonging to the same delivery point.

8. The apparatus as claimed in claim 7 wherein the mail items having a plurality of neighboring delivery points lie in the segments of an output conveyor one on top of the other in the specified sequence of the delivery points.

9. The apparatus of claim 1, wherein at least one of said at least two output conveyors is disposed beneath a part of the circulating temporary storage device in a u-shaped manner.

10. The apparatus of claim 1, wherein the circulating temporary storage device has, outside the overlapping area, at least one unloading station for additionally feeding out mail items from the pouches according to specific sorting criteria.

11. The apparatus as claimed in claim 3 wherein the buffering device has, outside the overlapping area, at least one unloading station for additionally feeding out mail items from the buffer pouches according to specific sorting criteria.

12. The apparatus as claimed in claim 3 wherein the part of the circulating temporary storage device projecting beyond the overlapping area and not located beneath the outputs of the buffer is ducted into an additional plane located above the plane of the buffer or below the plane of at least one of said at least two output conveyors, with the mail items circulating in both planes in the same direction.

13. The apparatus as claimed in claim 12 wherein height surmounting redirecting of the ring of pouches takes place inside the buffering device.

* * * * *